US008126895B2

(12) United States Patent
Sargent et al.

(10) Patent No.: US 8,126,895 B2
(45) Date of Patent: Feb. 28, 2012

(54) METHOD, APPARATUS, AND COMPUTER PROGRAM PRODUCT FOR INDEXING, SYNCHRONIZING AND SEARCHING DIGITAL DATA

(75) Inventors: Antony John Sargent, Belmont, CA (US); Erik Andrew Kay, Foster City, CA (US); David Moore, San Francisco, CA (US); Daniel L. Willhite, San Francisco, CA (US); Linus Upson, Redwood, CA (US)

(73) Assignee: Computer Associates Think, Inc., Islandia, NY (US)

( * ) Notice: Subject to any disclaimer, the term of this patent is extended or adjusted under 35 U.S.C. 154(b) by 442 days.

(21) Appl. No.: 11/245,100

(22) Filed: Oct. 7, 2005

(65) Prior Publication Data

US 2006/0080303 A1    Apr. 13, 2006

Related U.S. Application Data

(60) Provisional application No. 60/616,925, filed on Oct. 7, 2004.

(51) Int. Cl.
*G06F 7/00* (2006.01)
*G06F 17/00* (2006.01)
*G06F 3/00* (2006.01)

(52) U.S. Cl. ........ 707/741; 707/711; 707/715; 707/746; 715/241; 715/712

(58) Field of Classification Search .............. 707/3, 102, 707/101, 203, 999.203, 741, 711, 715, 746; 709/11, 206; 711/216, 162; 715/255–272, 715/241, 712; 702/179
See application file for complete search history.

(56) References Cited

U.S. PATENT DOCUMENTS

| | | | | |
|---|---|---|---|---|
| 5,469,540 A * | 11/1995 | Powers et al. | ................. | 715/203 |
| 5,825,355 A * | 10/1998 | Palmer et al. | ................. | 715/712 |
| 5,828,374 A * | 10/1998 | Coleman et al. | ............. | 715/786 |
| 6,631,522 B1 * | 10/2003 | Erdelyi | ........................ | 725/53 |
| 6,735,604 B2 * | 5/2004 | Miller et al. | ................. | 707/600 |
| 7,506,257 B1 * | 3/2009 | Chavez et al. | ................ | 715/714 |
| 7,801,896 B2 * | 9/2010 | Szabo | .......................... | 707/739 |
| 2001/0042114 A1 * | 11/2001 | Agraharam et al. | .......... | 709/223 |
| 2002/0178341 A1 * | 11/2002 | Frank | ............................ | 711/216 |
| 2003/0065652 A1 * | 4/2003 | Spacey | .............................. | 707/3 |
| 2003/0149748 A1 * | 8/2003 | Duisenberg | .................. | 709/219 |
| 2005/0028026 A1 * | 2/2005 | Shirley et al. | ..................... | 714/6 |
| 2005/0096866 A1 * | 5/2005 | Shan et al. | ..................... | 702/179 |
| 2006/0047715 A1 * | 3/2006 | Parizeau | ..................... | 707/203 |
| 2007/0061533 A1 * | 3/2007 | Burton et al. | ................. | 711/162 |
| 2009/0006496 A1 * | 1/2009 | Shoens et al. | ................. | 707/203 |
| 2009/0094332 A1 * | 4/2009 | Schemers et al. | ............. | 709/206 |

* cited by examiner

*Primary Examiner* — Mohammad Ali
*Assistant Examiner* — Bao Tran
(74) *Attorney, Agent, or Firm* — Sterne, Kessler, Goldstein & Fox P.L.L.C.

(57) ABSTRACT

A system, method and computer program product provide a search module for searching digital data. The search module operates, according to an embodiment, by indexing stored data without interrupting use of the stored data, synchronizing the indexed data with data stored subsequent to the indexing step, searching at least one of the synchronized data and the indexed data, and outputting results of the searching step.

33 Claims, 15 Drawing Sheets

METHOD, APPARATUS, AND COMPUTER PROGRAM PRODUCT FOR INDEXING, SYNCHRONIZING AND SEARCHING DIGITAL DATA

CROSS REFERENCE TO RELATED APPLICATIONS

The application claims benefit under 35 U.S.C. §119(e) to U.S. Provisional Application No. 60/616,925, filed Oct. 7, 2004, which is incorporated by reference herein in its entirety.

COPYRIGHTS AND TRADEMARKS

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. Various terms and icons in the figures may be trademarks or registered trademarks of this or other companies.

BACKGROUND

1. Field of the Invention

The present invention is related to searching digital data.

2. Related Art

As the use of email and email software packages have become more engrained in our daily lives, the amount of information received and stored by the software packages has increased dramatically. Most people now rely on their email software systems to communicate and keep track of every aspect of their lives through email, calendars, tasks, appointment, address books, etc. As the information grows in each of these, it has become harder and harder to find desired information in a timely manner. While most of these packages come with FIND functions, they are typically not robust enough to quickly find information, and sometimes cannot find the information at all if the user has forgotten specifics about what the information contains. Currently, no known search engines are specifically designed for real time synchronization of indexed and/or underlying data, or specifically designed to search an email product, while being integrated with the email product.

Therefore, what is needed is a system, method and computer program product that allows for more effective searching of large amounts of digital information.

SUMMARY

An embodiment of the present invention provides a method comprising the following steps. Indexing stored data without interrupting use of the stored data. Synchronizing the indexed data with data stored subsequent to the indexing step. Searching at least one of the synchronized data and the indexed data. Outputting results of the searching step.

Another embodiment of the present invention provides a system comprising a controller, at least one storage device, a graphical user interface, and a search module. The storage device stores initial data, indexed data, and synchronized data under control of the controller. The graphical user interface is controlled by the controller and enables a user to enter search commands. The search module searches at least one of the indexed data and the synchronized data. The graphical user interface displays the results of the search module.

In a further embodiment, the present invention provides a computer program product comprising a computer useable medium having computer program logic recorded thereon for controlling at least one processor, the computer program logic comprising computer program code modules that perform operations similar to the above-mentioned method and system embodiments.

Further embodiments, features, and advantages of the present inventions, as well as the structure and operation of the various embodiments of the present invention, are described in detail below with reference to the accompanying drawings.

BRIEF DESCRIPTION OF THE DRAWINGS

The accompanying drawings, which are incorporated herein and form a part of the specification, illustrate one or more embodiments of the present invention and, together with the description, further serve to explain the principles of the invention and to enable a person skilled in the pertinent art to make and use the invention.

Figure 1:
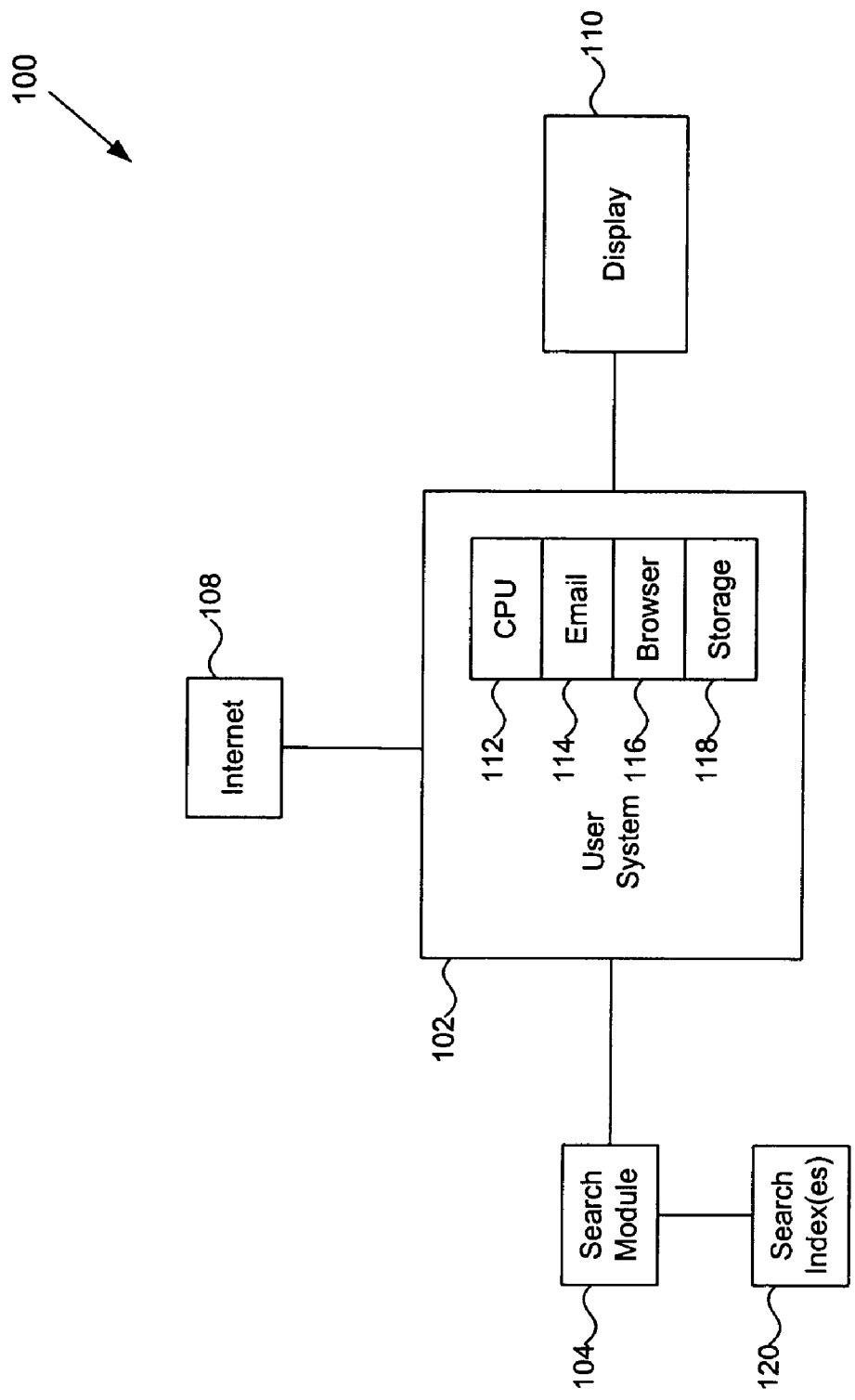
FIG. 1 shows a system, according to one embodiment of the present invention.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION

I. Overview
II. Exemplary Environment and Display Windows
III. Exemplary Computer System
IV. Exemplary Operations
   A. Overall Method(s)
   B. Indexing Method(s)
      1. Category Based Indexing
      2. Priority Based Indexing
      3. Compression Based Indexing
         a. Stemming
         b. Phonetic Coding
         c. Levenshtein distance
      4. Language Based Indexing
      5. Default Indexing
V. Synchronization Method(s)
   A. Notification Based Synchronization
   B. Non Notification Based Synchronization
   C. Deleted/Moved Message Based Synchronization
   D. Dropped Notification Based Synchronization
   E. Post Application Launch Based Synchronization
   F. Online and Offline Based Synchronization
VI. Exemplary Additional or Alternative Aspects of the Embodiment(s)
VII. Conclusion

I. OVERVIEW

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

One or more embodiments of the present invention provide a digital data (e.g., email data, stored data, messages, folders, files, etc., which are all used interchangeably throughout) search module that is, for example, downloadable onto a local computer via, for example, a computer readable medium, the Internet from a website, or through other known methods. Once downloaded onto the local computer, the search module is installed and then associates itself with one or more other programs already on the local computer. Once installed and opened, the search module has several functions and operations, for example, a building and maintaining an index function (e.g., indexing and synchronizing) and a searching function.

For example, the search program can build an index of digital data, which can allow for very rapid textual searches against the index. Then, the search program can maintain the index through synchronizing changes to the stored data or adding newly stored data to the index. When it is said herein that a data object in the storage device is compared to a data object in the index, it is meant that the data object in the storage device is compared to corresponding and/or related index information in the index. The indexed based searching function can allow for more efficient and effective searching of digital data on or associated with the local computer, for example, searching of emails, previously viewed website addresses, files, folders, calendars, address books, contacts, appoints, documents, etc. that may be stored locally or remotely via a wired or wireless network.

In one example, the index based searching allows for searching in five one hundredths of a second. However, actual performance will vary based on a number of factors, including but not limited to hardware configuration.

Also, in one example, an autocomplete function allows for autocompletion against both what may have been previously searched and/or what the user may be looking for based on indexed data.

The search program allows for instant search of digital data, for example, but not limited to, email data, website addresses, etc. In the email example, as an overview, the search program builds an index of the user's saved mail, and then allows for the ability to search gigabytes of data and quickly obtain results, often in a few hundredths of a second or less.

II. EXEMPLARY ENVIRONMENT AND DISPLAY WINDOWS

FIG. 1 is an exemplary environment 100 according to one embodiment of the present invention. In environment 100, one or more user systems 102 (either wired or wireless systems that can be handheld, portable, or stationary) include at least a CPU 112, a storage device 118 and a display 110. In the example of FIG. 1, an email program 114 and browser 116 are executing in the user system 102. The user system 102 is connected to the Internet 108.

The user system 102 also includes a search module 104 and search indexes 120. According to embodiments of the invention, the search module 104 can be integrated and/or associated with other programs, such as but not limited to the email program 114 and the browser 116.

An index, e.g., each of search indexes 120, is a collection of indices each having a set of fields. For example, the fields for email messages can be, but are not limited to, subject, body, from, to, cc, bcc, logical fields for type of message, size, attachments (yes or no), last modified date, and internal fields such as long term entryid, record key, search key, folder id, etc. Other fields can also be used. Fields for email as well as other data types will be apparent to persons skilled in the relevant art(s). These fields (or combinations thereof) can be indexed and used for searching. For example, a user can either chose to search a set of fields for a text search or search across all fields.

One function of search module 104 is to detect when an action has occurred to an object in a store, such as storage 118, and then act on that action in order to interrogate the object for its properties to properly index and/or synchronize the object for future searching.

In one example, search module 104 may be based on a C-LUCENE portion of an open source search engine called LUCENE that utilizes a JAVA library for indexing text.

In one example, email searching leverages additional structure found in an email, as compared to searching a webpage or other free-form data. For example, an embodiment of the invention enables searching in a number of field, such as to, from, cc, bcc, subject, body, etc. Also, email searching involves searching of all aspects of an email product, such as tasks, appointments, calendar, address book, etc. (hereinafter all are collectively referred to as messages, unless otherwise discussed).

In one example, search module 104 is designed to integrate with MICROSOFT OUTLOOK® ("Outlook"), while in other examples the search module 104 will integrate with MICROSOFT OUTLOOK EXPRESS® ("Outlook Express"), the Start button on the MICROSOFT WINDOWS® task bar, INTERNET EXPLORER® (IE), instant messaging clients, as well as other products.

In one example, integration involves two aspects: (1) user interface integrated with an underlying client, and (2) synchronizing the indices or objects in the index with the underlying data store (e.g., files, folders and messages) in current or real time (e.g., whenever an action occurs within a message store). This latter aspect is more challenging because of the varied notification methodology each underlying email client uses when messages are created, sent, received, moved, copied, deleted, renamed, draft, resaved draft, etc. for different types of folders, for example, private, public, etc.

It is to be appreciated that the elements in environment 100 and/or user system 102 are only exemplary and more or less elements could be used based on a desired configuration of the user. Also, while user system 102 is shown as being in a single location or product, the parts might be coupled together from one or more remote locations. Further, additional peripheral elements may be connected to environment 100 and/or user system 102, as would be appreciated by a skilled artisan upon reading and understanding this description. All these combinations and permutations are contemplated within the scope of the present invention.

Figure 2:
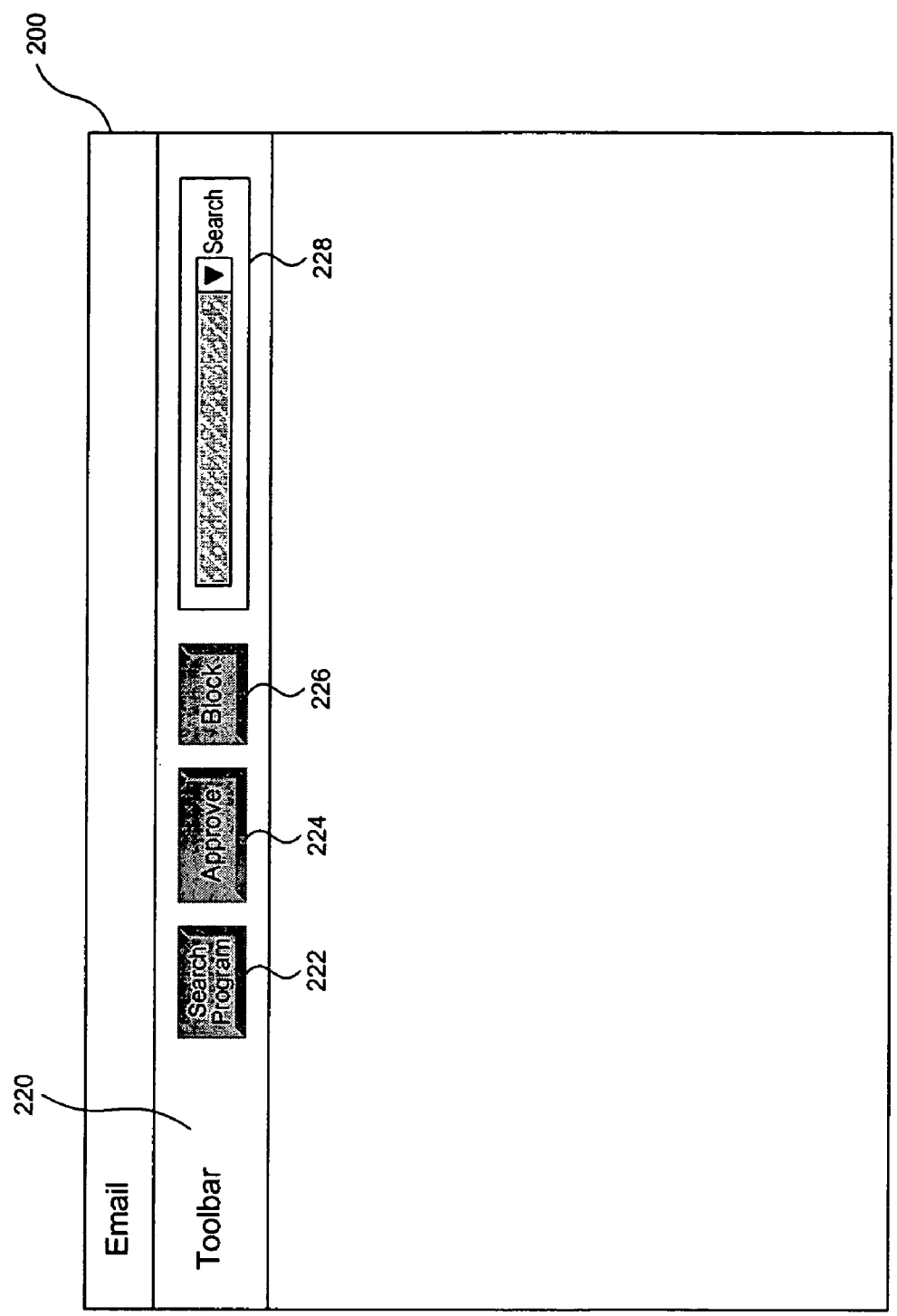
FIG. 2 shows an EMAIL window including search program command areas on a toolbar, according to one embodiment of the present invention.

FIG. 2 shows a window 200 associated with email product 114 as seen on display 110, according to one embodiment of the present invention. Window 200 includes a toolbar 220 that has a command button 222 for the search module 104, as well as buttons for functions associated with the search module 104, such as approve 224 and block 226 related to spam filtering. The toolbar 220 also includes a search box 228. Some of the functions and operations associated with this window are discussed below, while the operation of others will be apparent to persons skilled in the art based on the teachings contained herein.

Figure 3:
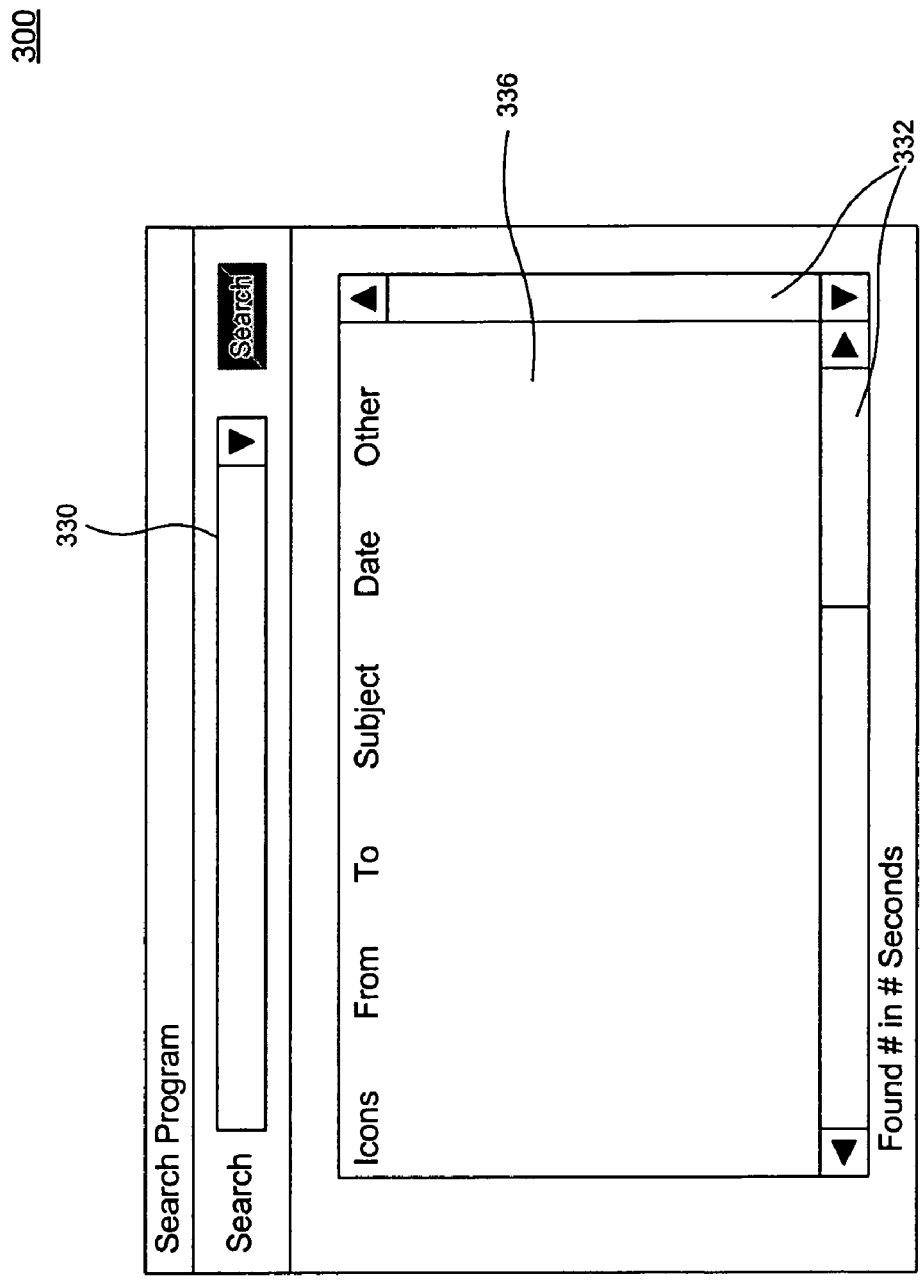
FIG. 3 shows a search window, according to one embodiment of the present invention.

FIG. 3 shows a search window 300, according to one embodiment of the present invention. The search window 300 includes a search results window 336. This embodiment of the invention displays, for each completed search, an ICON representing the area searched (i.e., EMAIL, WEB, PAGES I'VE SEEN, MY COMPUTER, IM, etc.), FROM, TO, SUBJECT, DATE, and OTHER (some of these fields may not apply to all objects found by a given search). There are also scroll bars 332 within the window 300. Some of the functions and operations associated with this window are discussed below, while the operation of others will be apparent to persons skilled in the art based on the teachings contained herein.

Figure 4:
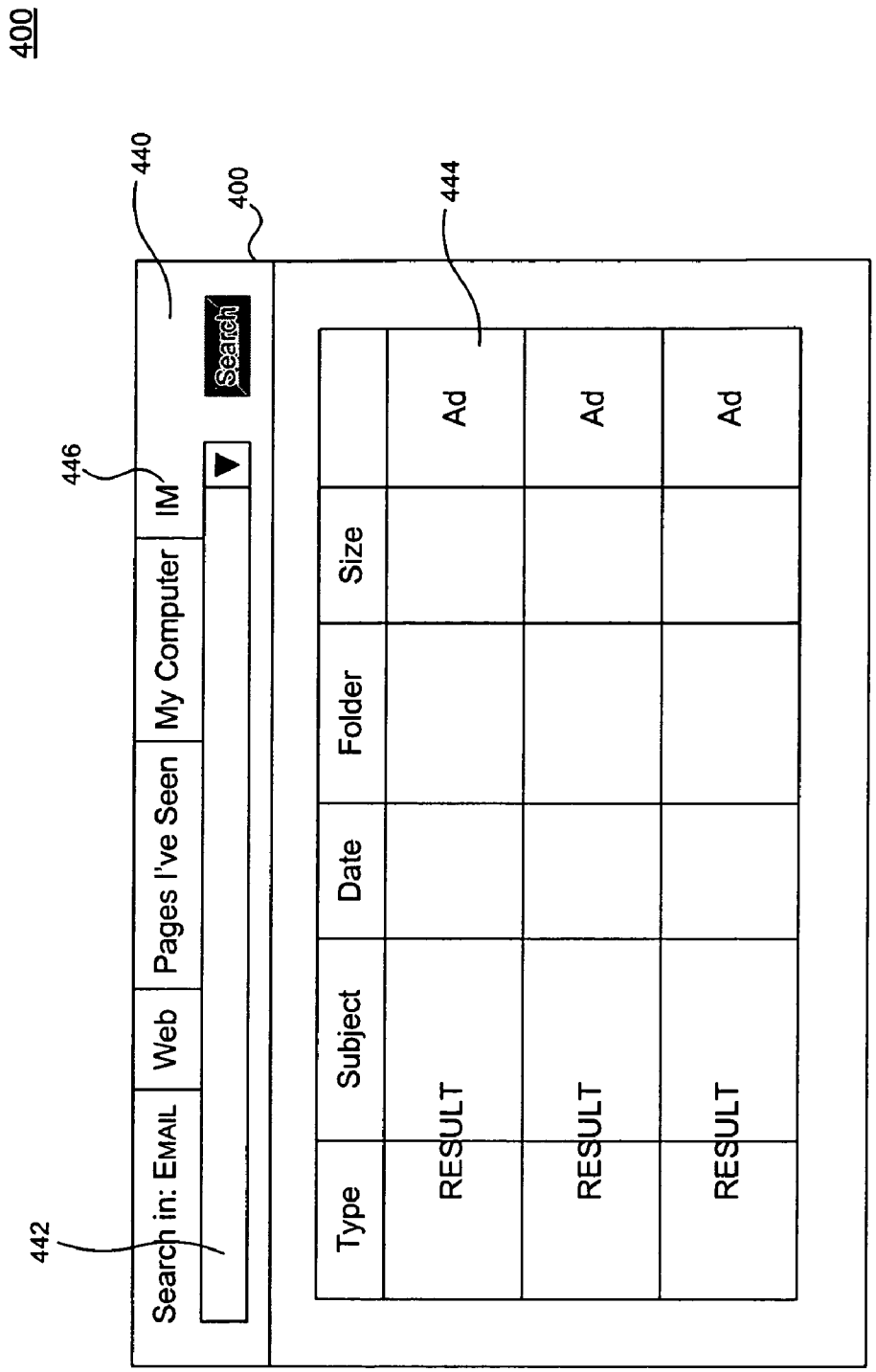
FIG. 4 shows a search window, according to an alternative embodiment of the present invention.

FIG. 4 shows search window 400, according to another embodiment of the present invention. Search window 400 includes a tool bar 440 associated with search module 104 that includes a search area 442 and search choices 446 EMAIL, WEB, PAGES I'VE SEEN, MY COMPUTER, and IM. The search choices 446 enable a user to search in one or more of these areas. Search results are displayed in a search results window 444. This embodiment of the invention displays, for each completed search, the TYPE (i.e., whether the hit was in EMAIL, WEB, PAGES I'VE SEEN, MY COMPUTER, IM, etc.), SUBJECT (for example, the file name or an excerpt of the identified object), DATE, FOLDER, and SIZE. The results window 444 may also display the number of hits in each area (for example, 123 hits in email, 1,234,344 hits on the Web, 2 hits in IM, etc.).

The results window 444 also allows the user to perform the same search (or different searches) in any of the other areas 446. For example, the user may perform an email search, and then perform the same search on the Web by clicking the corresponding search choice 446.

In some embodiments, the search module 104 displays in summary form the results (perhaps just counts) of the same search in other areas. For example, if a user searches a certain text string in an email client, summary results (number of hits) of the same search in IM, Internet, Internet email, and desktop data may also be displayed in the results window 444, along with links to enable the user to easily perform the searches.

Search results can also include other links relevant to the search. For example, search module 104 can detect information relevant to the search or the search results, such as an address in the message or a contact, and provide a link to a map. In another example, search module 104 can detect information about a flight in an email message search result and provide a link to a flight tracker. In yet another example, the search program can detect information about a company in a contact or an email message search result and provide a link to the company or stock information. These links can be based on contact, patterns, words, symbols, formats of information, etc., either found in a search string or the search results. The links can also be based on a profile of a user.

In some embodiments, the results window 444 displays advertisements. The ads are chosen based on a number of factors, such as the search, content of the results, a profile of the user, etc., or combinations thereof. For example, if an email message includes a question to another person regarding a topic, the ads can include information regarding that topic.

The invention enables search results to be displayed using simple text, or in HTML. In embodiments, search results across all search areas are displayed in either simple text form or HTML. Using a common format enables the advertisements to be unobtrusively integrated into the search results, thereby increasing the possibility that users will peruse and/or click-through the advertisements from one search area to the next (desktop, email, browser history, etc.).

Figure 5:
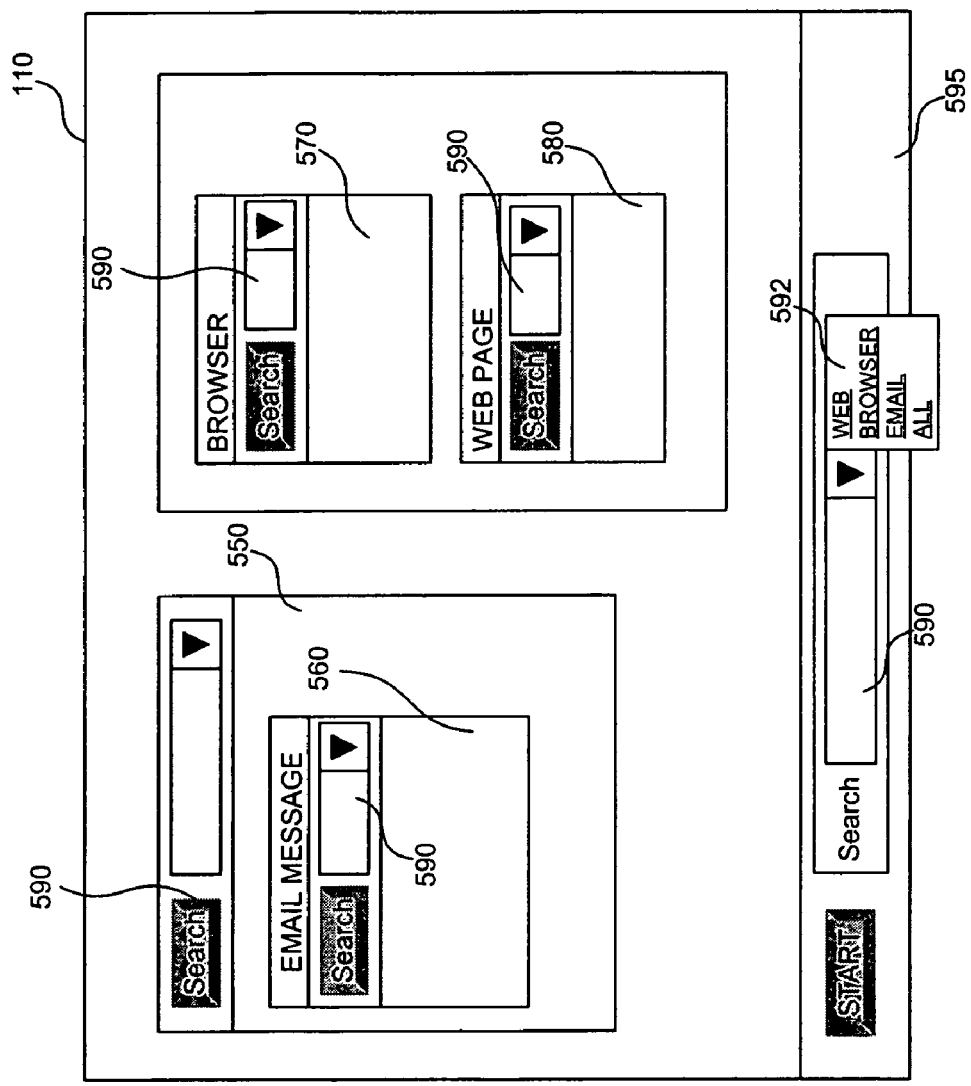
FIG. 5 shows a display of a user system, according to one embodiment of the present invention.

FIG. 5 shows an example display 110 having a number of open windows each corresponding to one or more active programs, including an EMAIL window 550, an EMAIL message window 560, a BROWSER window 570, and a WEB PAGE window 580. According to embodiments of the invention, the search module 104 can be integrated with these, as well as other, applications.

In particular, each open window 550, 560, 570, and 580 includes a tool bar including a search box 590 associated with search module 104. Also, a desktop toolbar 595 includes a search box 590 associated with search module 104. In the example of FIG. 5, the desktop toolbar 595 is located next to the operating system START button.

According to an embodiment of the invention, search boxes 590 (i.e., the search module 104) are integrated with these applications (for example, the email program 114 and the browser program 116) by utilizing the application program interfaces (APIs) of the applications. While APIs differ from program to program, the use of such APIs to integrate different programs is well known.

In an embodiment, the context or location of the search box 590 identifies the default area in which searches initiated from that search box are directed. For example, searches initiated in the EMAIL window 550 are performed among email data. More particularly, in Outlook and Outlook Express, search boxes 590 will default to searching email (and other PIM data such as contacts, appointments, etc.). Similarly, search boxes 590 in IE will default to searching the web and/or browser history (previously displayed pages), and the search box in the desktop toolbar 595 will search files in the local computer. Search boxes 590 used to search the Internet can be configured by the user to search using one or more particular search engines, such as GOOGLE, YAHOO, etc. Each search box 590 also enables searching in other areas via pop-up or drop-down windows, such as window 592. Alternatively, the user can select the area to search by selecting among icons displayed next to the search boxes 590 (not shown in FIG. 5), where the icons correspond to the different search areas. Also, the user may change the default search area settings of the search boxes 590.

It is to be appreciated that the user interface windows of FIGS. 3-5 are merely examples. Windows having different options and/or different layouts will be apparent to persons skilled in the relevant art(s) based on the teachings contained herein. All such permutations and combinations are contemplated and within the scope of the present invention.

III. EXEMPLARY COMPUTER SYSTEM

Figure 6:
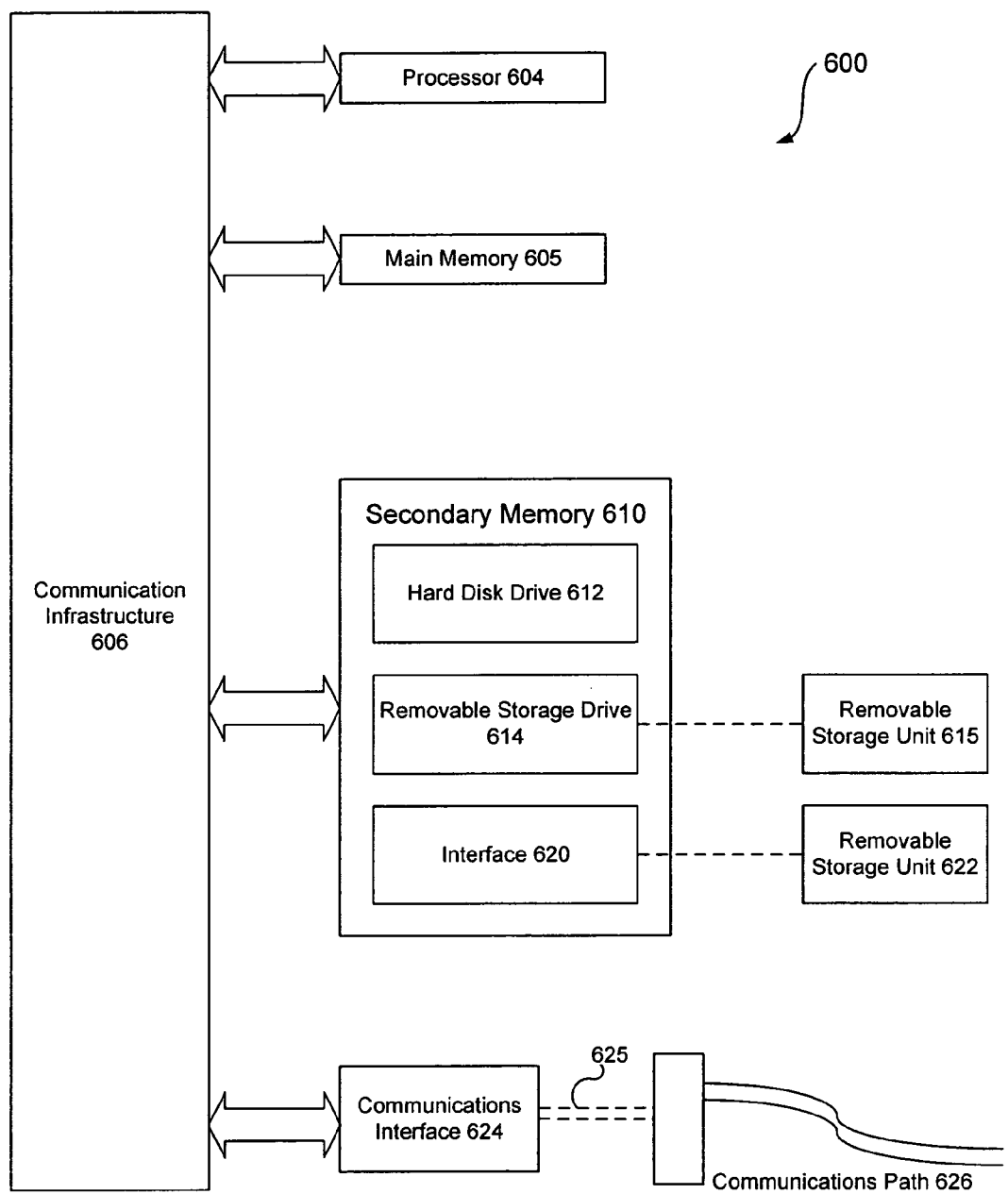
FIG. 6 shows an exemplary computer system for performing operations associated with a search program, according to one embodiment of the present invention.

Embodiments of the invention described herein can be implemented using well known computers, such as the example computer 600 shown in FIG. 6.

The computer 600 includes one or more processors 604. Processor 604 can be a special purpose or a general purpose digital signal processor. The processor 604 is connected to a communications infrastructure 606 (for example, a bus or network).

Computer system 600 also includes a main memory 605, such as random access memory (RAM), and may also include secondary memory devices 610. The secondary memory devices 610 may include, for example, a hard disk drive 612 and/or a removable storage drive 614, representing a floppy disk drive, a CD drive, a DVD drive, a magnetic tape drive, an optical disk drive, etc. The removable storage drive 614 reads from and/or writes to a removable storage unit 615 in a well known manner. Removable storage unit 615 represents a floppy disk, magnetic tape, optical disk, CD, DVD, etc. As will be appreciated, the removable storage unit 618 includes a computer usable storage medium having stored therein computer software and/or data.

In alternative implementations, secondary memory 610 may include other similar means for allowing computer programs or other instructions to be loaded into computer 600. Such means may include, for example, a removable storage unit 622 and an interface 620. Examples of such means may include a program cartridge and cartridge interface (such as that found in video game devices), a removable memory chip (such as an EPROM or PROM) and associated socket, etc.

Computer system 600 may also include a communications interface 624. Communications interface 624 allows software and data to be transferred between computer system 600 and external devices. Examples of communications interface 624 may include a modem, a network interface (such as an Ethernet card), a communications port, a PCMCIA slot and card, wireless communication interfaces, etc. Software and data transferred via communications interface 624 are in the form of signals 658 (electromagnetic, optical, etc.) capable of being received and/or transmitted by communications interface 624. These signals 624 traverse a communications path or medium 626. Communications path 626 carries signals 625 and may be implemented using wire or cable, fiber optics, a phone line, a cellular phone link, a wireless link, an RF link and/or other communications channels.

Computer programs (also called computer control logic) are stored in main memory 608 and/or secondary memory 610. Computer programs may also be received via communications interface 624. Such computer programs, when executed, enable the computer system 600 to implement the functions of the invention as discussed herein.

Articles of manufacture in which computer programs are stored, such as main memory 605, secondary memory 610, signals 625, etc., are herein called "computer program products." Such computer program products include a computer readable or useable medium in which computer programs are stored. The computer programs, when executed, cause processor(s) 604 to perform the features and functions of the invention described herein. The invention is also directed to such computer program products having stored therein software that enables computer(s) to perform the functions described herein.

IV. EXEMPLARY OPERATIONS

A. Overall Method(s)

Figure 7:
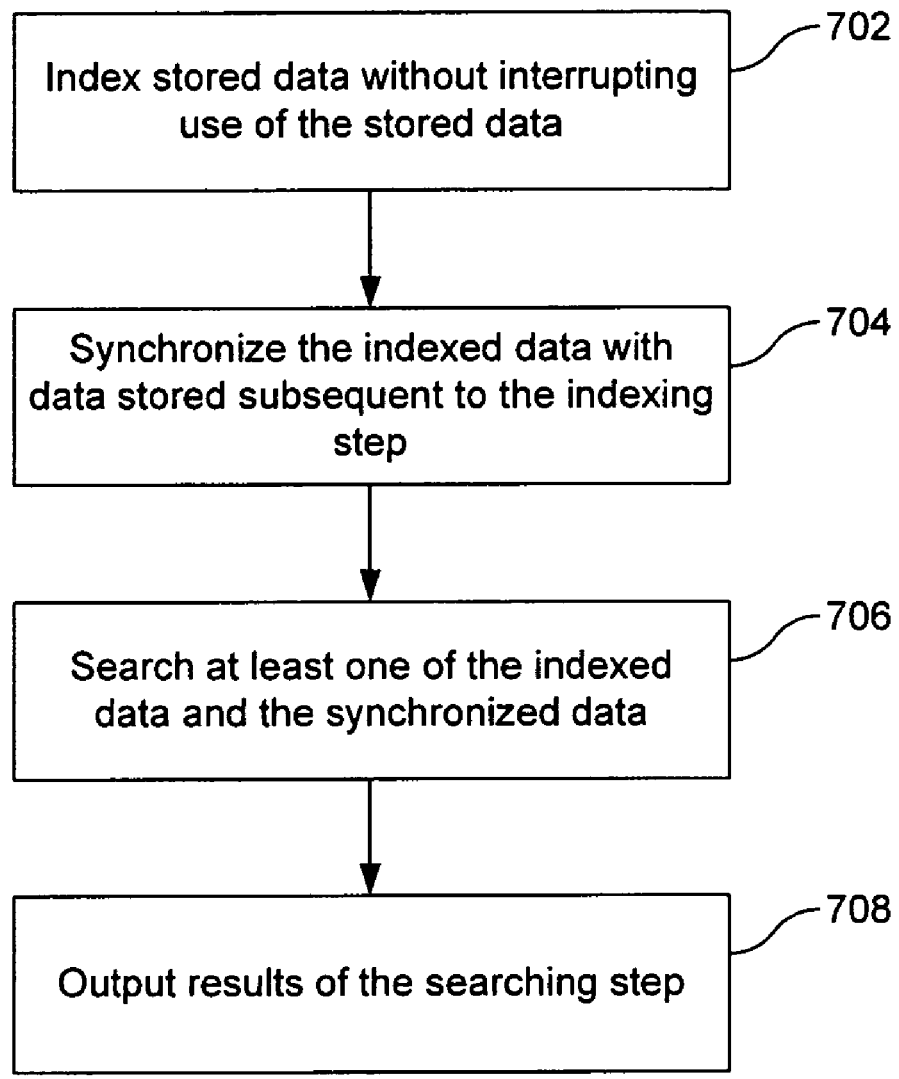
FIG. 7 shows a flowchart depicting a method, according to one embodiment of the present invention.

FIG. 7 is a flowchart depicting a searching method 700 according to an embodiment of the present invention. The searching method 700 is performed by the search module 104 executing in the user system 102.

In step 702, the search module 104 indexes data stored in the storage device 118. The resulting indices form part of the search indexes 120. The data indexed by the search module 104 in this step includes, but is not limited to, emails, calendars, tasks, appointments, address books, documents and other files or data objects stored in the user system. Such data is stored in storage device 118, which in implementation may be one or more devices either local or remote (i.e., over a network) to computer system 102. According to embodiments of the invention, the indexing of step 702 is performed without interrupting access or use of the data in storage device 118.

In step 704, the search module 104 synchronizes the indexed data with any changes to the data in the storage device 118 subsequent to operation of the indexing step 702. This synchronization step allows for real-time updates to indexed objects to account for any changes that may have occurred to the stored data since indexing the stored data, e.g., deleting, moving, revising, etc, or to add any newly stored data to the index. This will allow for a later quick and accurate search on the indexed data, without having to completely re-index the entire data store of storage device 118. As discussed above, when it is said herein that a data object in the storage device is compared to a data object in the index, it is meant that the data object in the storage device is compared to corresponding and/or related index information in the index.

In step 706, the search module 104, in accordance with search requests issued by the user, uses the search indexes 120 to search either the indexed data or the synchronized data. For example, after the initial indexing, searches would be performed on the indexed data of step 702. However, if all or some of the indexed data has also been further processed through the synchronization step 704, the search would be performed on the indexed data and any data that has subsequently been synchronized.

In step 708, the search module 104 displays the results of the search operation(s) performed in step 706.

According to embodiments of the invention, steps 706 and 708 can be performed during the indexing step 702 and/or during the synchronizing step 704.

Example user interfaces used during performance of steps 706 and 708 are shown in FIGS. 2-5, described above.

B. Indexing Method(s)

Step 702 of FIG. 7, the indexing step, shall now be described in greater detail.

In order to allow for fast searching of stored data, e.g., email, search module 104 first builds and then maintains an index of all of the user's stored data, e.g., email and other PIM (personal information manager) data including appointments, contacts, tasks, notes, journal entries, etc. (hereinafter, all referred to as messages). Maintaining the index is performed through one or more of the synchronization processes (step 704) described throughout. In one example, the building and maintaining of the index is performed without interrupting use of the stored data, if a user so desires.

One concern for indexing is minimal annoyance to the user, while allowing for a later faster and more effective search. Reducing annoyance can be based on when indexing is done and/or how indexing is done. In other words, text indexing systems have a trade-off between fast reads and fast writes. In one example, search module 104 is optimized for fast writes when building the initial index. Search module 104 also does fast writes when updating the index, i.e., performing synchronization. Search module 104 incurs the cost of optimizing the index for fast reads when the user is idle.

Figure 8:
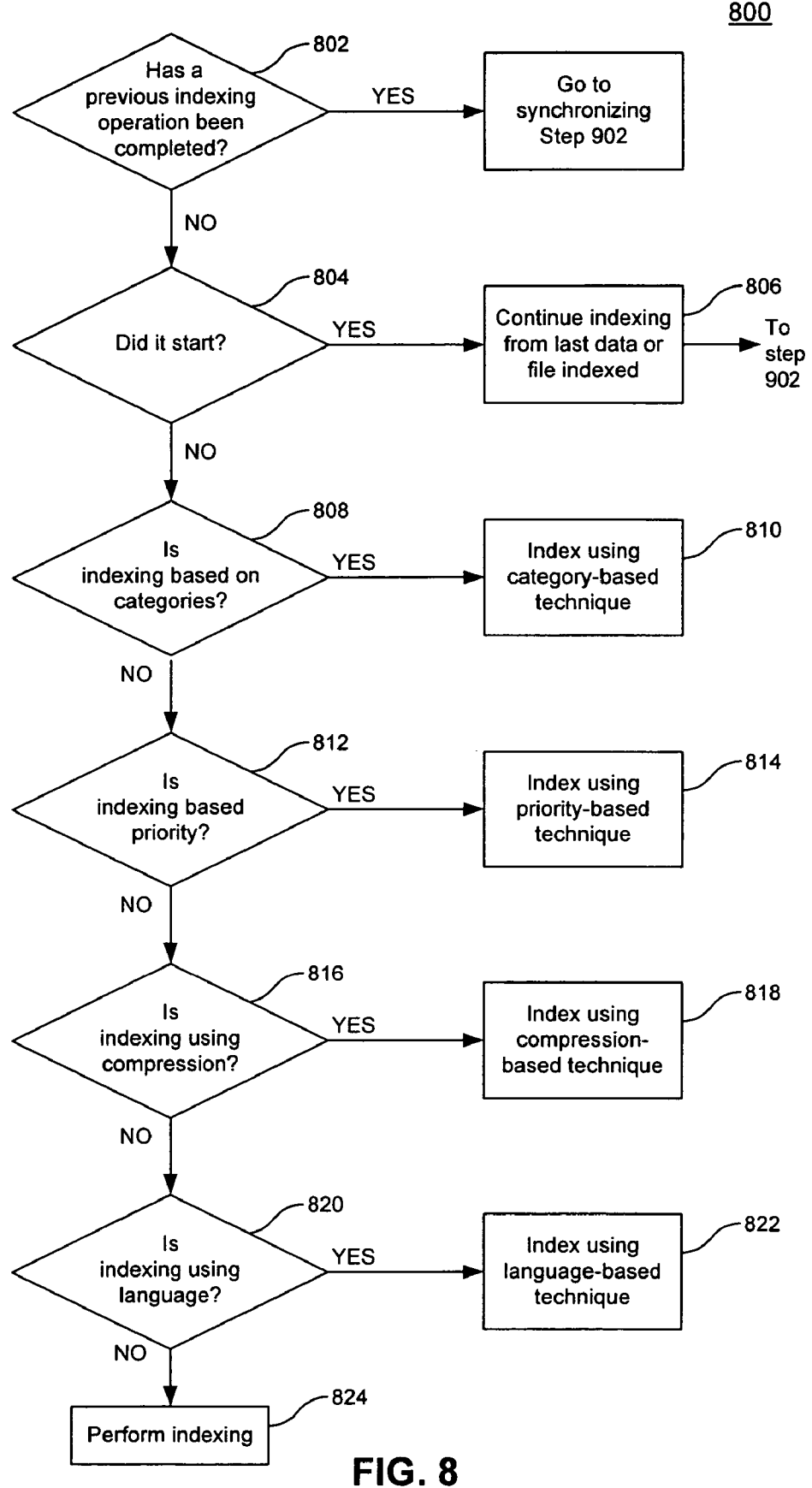
FIG. 8 shows a flowchart depicting an indexing method, according to one embodiment of the present invention.

FIG. 8 is a flow chart depicting an indexing method 800, according to one embodiment of the present invention. Method 800 represents an embodiment of step 702 of FIG. 7.

In step 802, a determination is made whether a previous indexing operation has completed. If yes, the entire data store in storage device 118 is not re-indexed. Instead, the existing indexes 120 are augmented/updated via synchronization (step 704), which is described in greater detail below with reference to flowchart 900 in FIG. 9. If no, in step 804 a determination is made whether a previous indexing operation has started, but not completed. If yes, in step 806 the previous indexing operation is re-initiated from the last stored data indexed. Step 806 involves performance of step 902, illustrated in FIG. 9 and described below.

If no at step 804 (no indexing has started), indexing is started. Indexing can performed using any well known techniques, e.g., using categories, prioritizing files or folders, compressing data, etc. Select techniques for indexing are described in more detail below, although it should be understood that the invention is not limited to the indexing embodiments described herein. Again, if no at step 804, method 800 moves onto one or more of steps 808, 812, 816, 820, and 824 described below.

1. Category Based Indexing

In step 808 a determination is made whether indexing will be performed using a category-based technique. If no, method 800 moves to step 812. If yes, at step 810 the stored data is indexed using categories. Category-based indexing is well known, and shall not be described herein except as follows. In this embodiment, indexing is enhanced when search criteria are used to set the parameters for the indexing. For example, what is indexed (what categories are used) and how the messages are interrogated (what processing is done to the text) contribute to forming indexed categories that are more susceptible to better, more effective, and faster searching 2. Priority Based Indexing In step 812 a determination is made whether indexing is based on prioritizing the stored data. If no, method 800 moves to step 816. If yes, at step 814 the stored data is indexed using a priority-based technique. Priority-based indexing is well known, and shall not be described herein except as follows. In one example, when search module 104 builds the initial index, search module 104 starts with the folder most likely to be searched first by the user. For example, with respect to the EXCHANGE email software client, search module 104 starts with the Contacts folder first, and Inbox next, since these are heavily used by users. The folder most likely to be searched first can be preset as: known important folders, folders with the most last modified messages, etc. Then, folders with the least messages are indexed, and so on. The public, SPAM (e.g., bulk, junk, etc.), and deleted folders can be indexed last, if at all.

It is to be appreciated that other priority-based indexing techniques can also be used, as are defined by individual user's preferences.

3. Compression Based Indexing

In step 816 a determination is made whether the indexing will be performed using compression of the stored data. If no, method 800 moves to step 820. If yes, at step 818 the stored data is indexed using a compression-based technique. Compression-based indexing is well known, and shall not be described herein except as follows. Compression-based techniques are useful because they often decrease the amount of information indexed. This is of particular importance with the present invention, where the data set to be indexed can include many fields, such as subject, body, from, to, cc, bcc, type, attachment, last modification date, long term entryid, record key, search key, folder id, etc. According to embodiments of the invention, a number of compression-based techniques can be used, including but not limited to stemming, phonetic coding, and Levenshtein distance techniques, which are described below. Indices for the compressed data are typically kept in their own fields in the index separate from any other indices related to the data in its uncompressed form a. Stemming When using stemming, the search module 104 identifies the stems of search terms input by the user, and then performs the search using both the search terms and their respective stems. For example, the stem of 'running' is 'run.' The stem of 'ran' is also 'run.' Stems can be identified using well known algorithms, dictionaries, or a combination of both. Stemming is well known, and shall not be described herein except as follows.

When stemming is used for compression-based indexing, search module 104 uses word stemming for fields that are likely to contain normal words and sentences, but not for fields that are less likely to contain normal words and sentences. This is most important in languages having nouns that stem, e.g., German. According to an embodiment, the subject and body fields are stemmed. Other fields that do not typically contain data that is useful to stem are not stemmed (for example in email, To, From, Name, Address, Phone Number, and Category are typically not stemmed).

In one example, during the indexing step 818, search module 104 keeps the stems in separate fields of the search indexes 120 so that the original word positions are maintained. Accordingly, when performing searches, the search module 104 is aware when it has an exact match, or when it has matched a stem. In embodiments, search module 104 establishes a section/separate field of the index 120 that only saves messages including stems of words to make searching faster. However, a user always has the option to search all full messages and not just the stems. Thus, a user may be given the option to search stems only or entire messages. For example, when autocomplete is being used (described further below), a user may want to autocomplete against full terms, and not stems.

b. Phonetic Coding

Phonetic coding is well known, and shall not be described herein except as follows.

When phonetic coding is used for compression-based indexing, search module 104 uses phonetic coding on fields that contain words and names (e.g., name, addresses, subject, body, etc.). For example, Anderson, Andersen, Andersin, etc., as well as soundex, metaphone, double metaphone, are examples of phonetic coding algorithms. It is to be appreciated that different algorithms can be used based on the language of the data store in the storage device 118. Phonetic coding allows for later fuzzy matches on misspelled words and names. For example, the search module 104 will use words that sound alike to index into phonetic fields. Search module 104 also allows for both a field of phonetic coded data to be saved along side of all data from a message so that a user has the option of searching the compressed data as well as the full data.

c. Levenshtein Distance

Levenshtein distance techniques are well known, and shall not be described herein except as follows.

When Levenshtein distance is used for compression-based indexing, search module 104 uses Levenshtein distance to handle misspellings. Levenshtein distance is a measure of the similarity between two strings, which we will refer to as the source string (s) and the target string (t). The distance is the number of deletions, insertions, or substitutions required to transform s into t. For example, if "s" is "test" and "t" is "test", then LD(s,t)=0, because no transformations are needed. The strings are already identical. In another example, if "s" is "test" and "t" is "tent," then LD(s,t)=1, because one substitution (change "s" to "n") is sufficient to transform s into t. The greater the Levenshtein distance, the more different the strings are. This is a way to do string matching with errors. It does not rely on stems or phonetics. Instead, it is just the number of edits that need to be made to turn one string into another string, i.e., changes to individual characters in a word. Use of Levenshtein distance is effective for catching typographical errors, and is useful for all fields.

4. Language Based Indexing

In step 820 a determination is made whether the indexing will be language-based. If no, method 800 moves to step 824. If yes, search module 104 in step 822 detects the language (e.g., English, German, French, etc.) of the data object being indexed, and indexes the data object using indexing algorithms specific to that language. Step 822 is performed using language specific indexing parameters (stemming, phonetic coding, etc.). Language-based indexing is well known, and shall not be described further.

5. Default Indexing

If no at steps 804, 808, 812, 816, and 820, i.e., indexing has not started and indexing will not involve categories, priorities, compression or language, then at step 824 indexing is performed by storing indices relating to the data objects from storage device 118 into index 120.

It is to be appreciated that the order of steps 808/810, 812/814, 816/818, and 820/822 can be changed, so long as these steps occur before default indexing is performed at step 824. Thus, it is to be appreciated that other techniques can be used to interrogate messages in order to index the messages as desired, as would be apparent to one skilled in the art upon reading and understanding this disclosure.

In one example, the present invention includes two separate indices, one for folders and one for individual messages. Each index is updated and/or synchronized against an actual folder or message store.

In one example, folders inherit the index status of their parent if copied within a same area as parent. If the folder is moved, the folder can keep the index status of a previous position.

V. SYNCHRONIZATION METHOD(S)

Step 706 of FIG. 7, the synchronization step, shall now be described in greater detail. While the following is presented in the context of email messages, these embodiments are generally applicable to any type of data objects.

As discussed above, after the initial indexing step 702 is completed, the indexed data in indexes 120 is maintained or synchronized to include subsequent changes to the stored data in storage device 118. Such operation is performed in the synchronization step 704.

As discussed, changes can be, but are not limited to, additions, deletions, modifications, moves, etc., occurring to data and/or folders in the storage device 118 from one time period to a subsequent time period. The synchronization step 704 operates generally as follows. The data objects associated with stored data in storage device 118 is compared to data objects in the index 120 to determine if a change has occurred. If a change has occurred, the index 120 is updated to reflect that change. Also, data object associated with folders including multiple pieces of data in the storage device 118 are compared to data objects of the folders in the index 120. If contents of the folders have changed, the index 120 is updated to reflect those changes.

Figure 9:
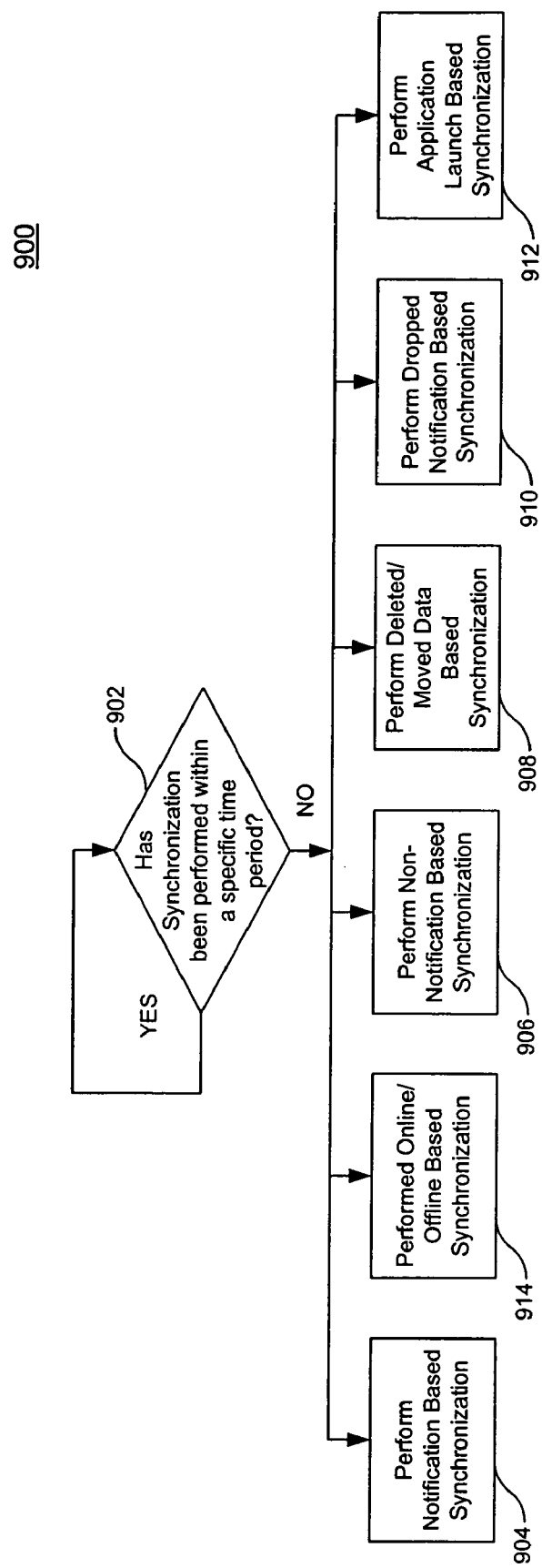
FIG. 9 shows a flowchart depicting a synchronization method, according to one embodiment of the present invention.

FIG. 9 shows a flowchart depicting a synchronization method 900, according to one embodiment of the present invention. Synchronization method 900 can occur during step 704 discussed above.

In step 902, a determination is made whether synchronization has occurred within a specific time period. If yes, then it is not necessary to synchronize the search index 120, and the method 900 remains at step 902. The length of the time period is implementation specific, and may be adjusted by the user in some embodiments.

If no in step 902, then method 900 moves to one or more of steps 904 (Notification Based Synchronization), 906 (Non Notification Based Synchronization), 908 (Deleted/Moved Message Based Synchronization), 910 (Dropped Message Based Synchronization), 912 (Application Launch Based Synchronization), and 914 (Time Based Synchronization), which are each discussed in more detail below.

A. Notification Based Synchronization

In step 904, when an underlying software program allows for files, messages, or folders to notify search module 104 that an event has occurred, notification based synchronization is performed.

Figure 10:
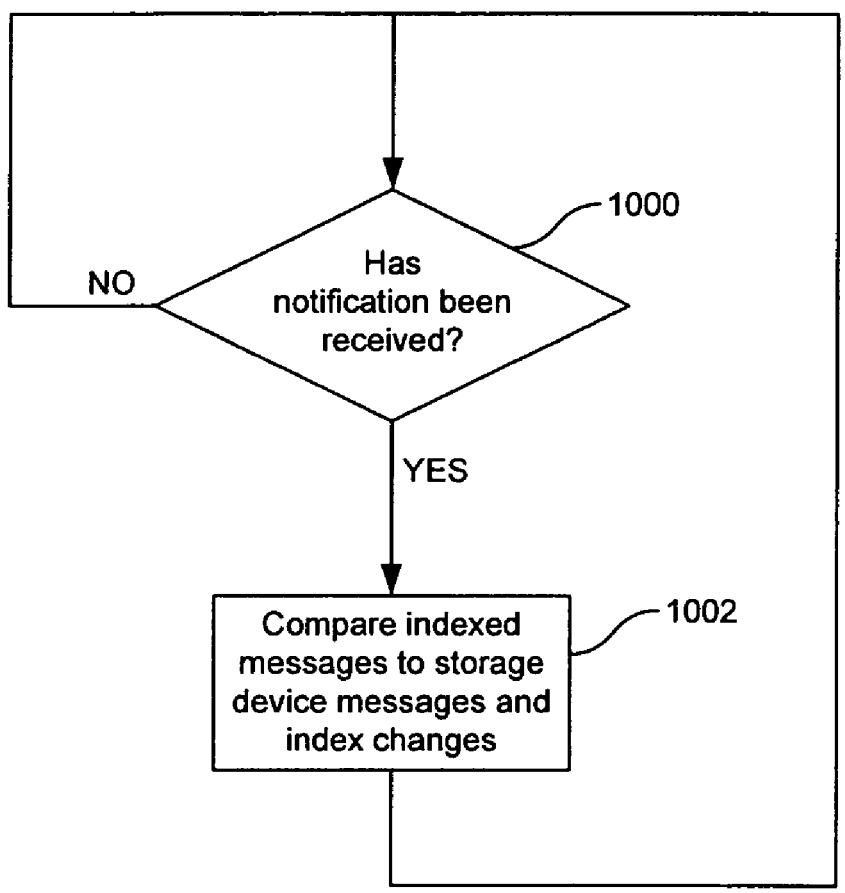
FIG. 10 shows an exemplary notification based method, according to one embodiment of the present invention.

FIG. 10 shows an exemplary notification based method that can occur during step 904, according to one embodiment of the present invention. In step 1000, a determination is made whether a notification has been received from a software program. If no, method 904 remains at step 1000. If yes, in step 1002 search module 104 compares data objects associated with the notifications with corresponding data objects in storage device 118 to identify changes—the search module 104 then reflects those changes in the index 120. Then, method 904 returns to step 1000.

In notification based synchronization, for an email example, search module 104 tracks notifications for changes to the indexed messages. Search module 104 can provide support for create, delete, update, move, and copy operations. Once a notification is received by the search module 104, synchronization is performed. In one example, by waiting a short period before processing a notification, search module 104 can avoid doing unnecessary processing. For example, suppose an email arrives into the user's inbox, and then a rule moves the email from the inbox to a folder. If the search module 104 immediately processed the arrival of the email into the inbox, search module 104 would then have to also process the move of the email from the inbox to the folder. By waiting a short time, search module 104 need only update the index 120 to reflect the email in the folder.

For an example using OUTLOOK, all notifications related to local personal folders contain a stable long-term identifier, entryid, that can be used by search module 104 to find the corresponding message in the index 120. Thus, it relatively easy to update index 120 and link to messages in local personal folders. Also, the long-term entryid allows search module 104 to find a given message, as well as all various properties of the message. In embodiments, every time search module 104 requests a message from the index 120 using entryid, it should always receive the same message. Thus, search module 104 can easily update (synchronize) the index 120 based on the notifications.

B. Non Notification Based Synchronization

In step 906, when an underlying software program does not allow for files, messages, or folders to notify search module 104 that an event has occurred, non-notification based synchronization is performed.

Figure 11:
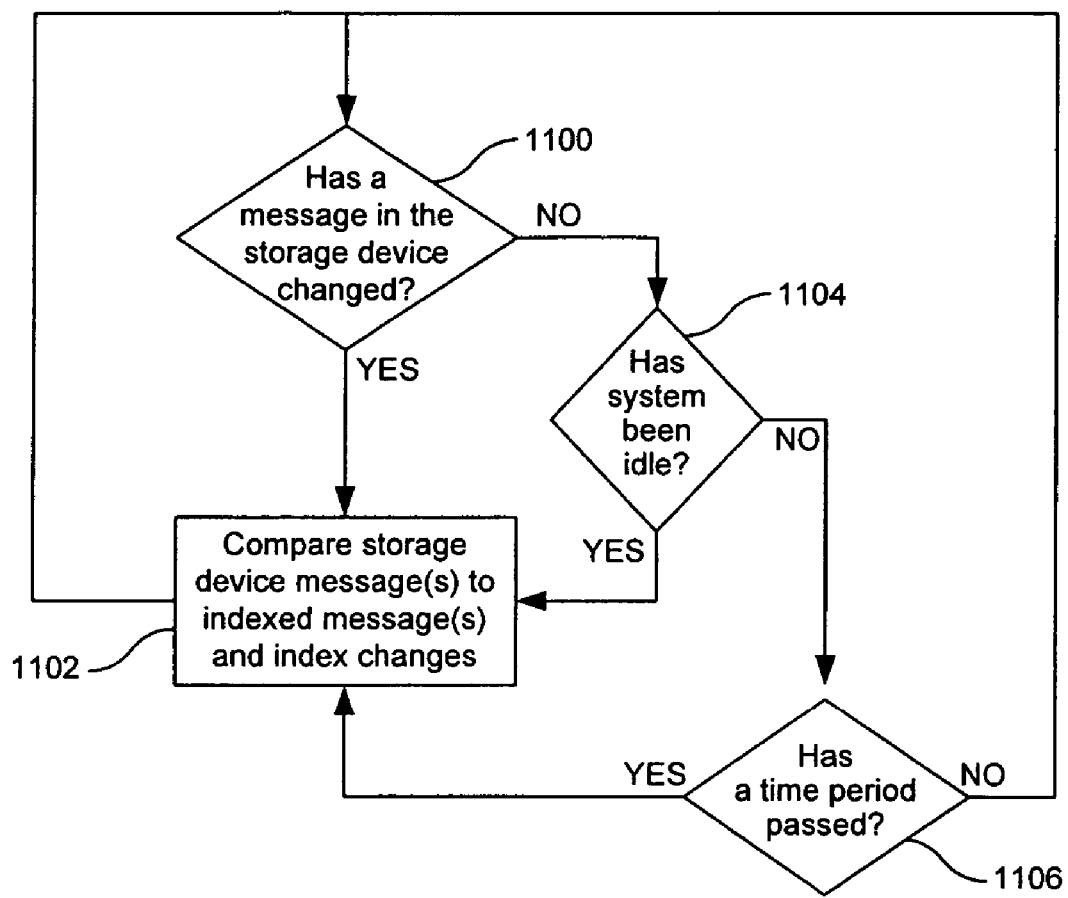
FIG. 11 shows an exemplary non notification based synchronization method, according to one embodiment of the present invention.

FIG. 11 shows an exemplary non-notification based synchronization method that can occur during step 906, according to one embodiment of the present invention. In step 1100, a determination is made whether one or more data objects in storage device 118 have been changed. If yes, search module 104 compares the changed data object in storage device 118 with the corresponding data object in index 120 to synchronize the data objects and indexed the changes. Thereafter, the method 906 returns to step 1100. If no in step 1100, at step 1104 a determination is made whether the system 102 has been idle. If yes, method 906 moves to step 1102. If no, in step 1106 a determination is made whether a specified time period has passed. If yes, method 906 moves to step 1102. If no, method 906 moves to step 1100.

For example, OUTLOOK EXPRESS has no notification scheme. In non-notification based synchronization, search module 104 monitors underlying data files in order to index and synchronize.

Public folders typically do not provide notifications, so search module 104 can use incremental change synchronization (ICS) or other synchronization algorithms to find changes there. For example, during ICS search module 104 asks the EXCHANGE store what has been changed since the last request, and the added, created, and deleted messages can be determined. This can be used to determine what message was removed from message store, and the index 120 can then be appropriately updated. This is most helpful with the backside or source side of moves and deletes, which are discussed in more detail below.

In an example using public folders, which as noted above typically do not provide notifications, synchronization can be performed either periodically or when the system 102 is idle. Alternatively, the public folder can be interrogated using the ICS methodology discussed above.

As another example, when an EXCHANGE store has too many messages, some notifications may not be generated. This can occur when a user performs a great many actions at a single time, e.g., mark all read, mark all unread, move an entire folder, delete a lot of email at once, when saving a draft, editing the saved draft, and resaving the draft. In one example, when no notification is generated because of these circumstances, synchronizing starts at the folder level and then moves to the message level, processing all messages in a single folder at a time. Thus, the synchronizing operations can be delayed and then checked for a last action in time to use as the final message to synchronize for indexing.

C. Deleted/Moved Message Based Synchronization

In step 908, when data objects have been moved or deleted, a deleted/moved data object based synchronization method is performed.

Figure 12:
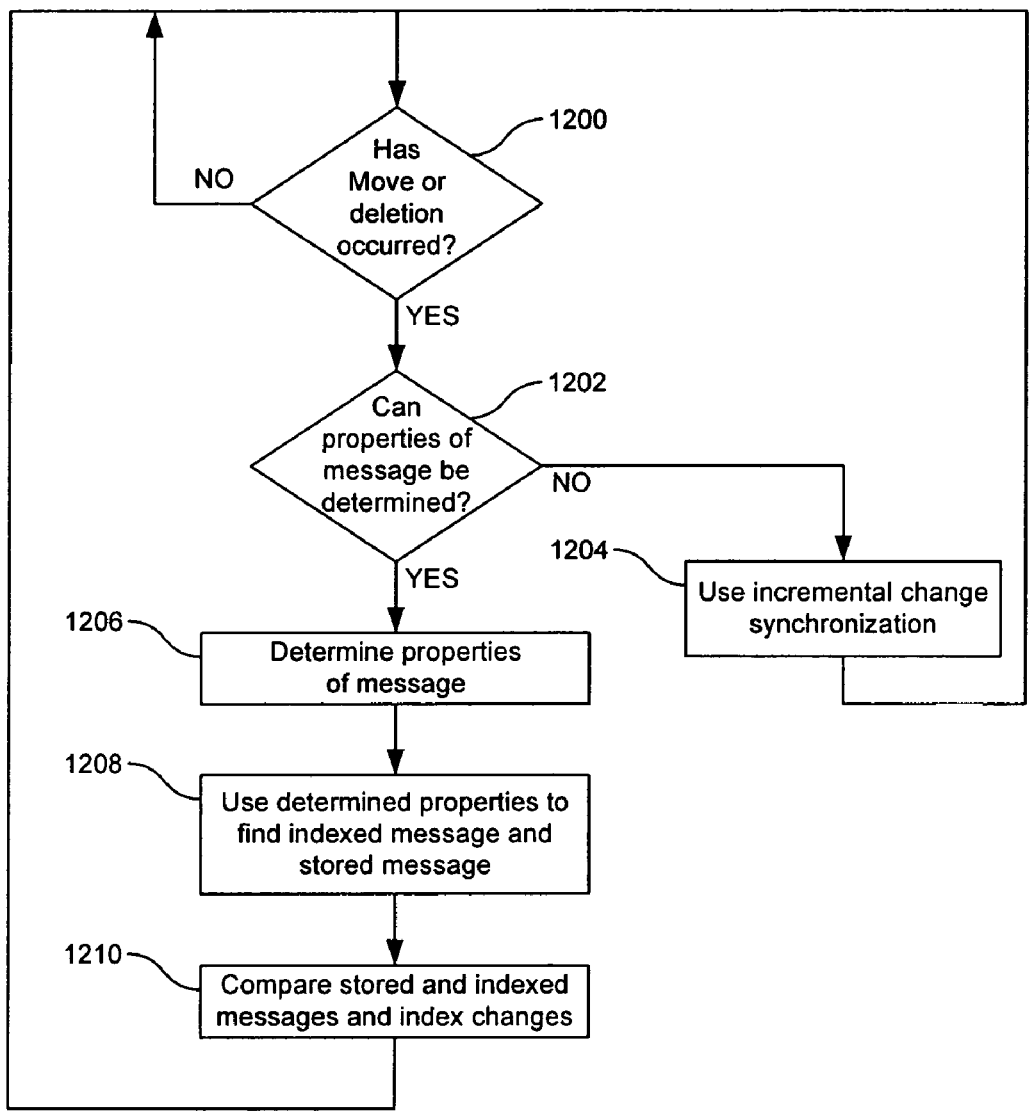
FIG. 12 shows an exemplary deleted/moved message synchronization method, according to one embodiment of the present invention.

FIG. 12 shows an exemplary deleted/moved message synchronization method that can occur during step 908, according to one embodiment of the present invention.

In step 1200, a determination is made whether a move or deletion has occurred. If no, method 908 remains at step 1200. If yes, then in step 1202 a determination is made whether properties of the message can be determined, where exemplary properties are discussed below.

If no at step 1202, then at step 1204 incremental change synchronization (ICS) is performed, which is described in more detail below. The method then returns to step 1200.

If yes at step 1202, then at step 1206 the search module 104 determines the properties of the message.

In step 1208, search module 104 uses the properties to find data objects related to the indexed and related stored messages.

In step 1210, search module 104 compares the related data objects of the indexed and stored messages to what is in the search indexes 120, and indexes the changes. Then, method 908 returns to step 1200.

For example, while the EXCHANGE message store allows search module 104 to monitor for newly created messages, the backside of moves (e.g., the location from which a message is moved or a moved from area) and delete notifications use a short-term entryid that is usually no longer valid when indexing, synchronizing, and/or searching is performed. This short term entryid cannot be used to look up the message in the message store or the index 120. Even though EXCHANGE allows for conversion of short-term entryid's to long term entryid's, in EXCHANGE the long term entryid's may not be unique. This short term entryid can be used for synchronizing of create, update, copy, and destination side of moves (moved to location) because synchronizing is usually done timely enough by search module 104 to use this to at least initially index the message.

In various examples, search module 104 overcomes this inability to use short term entryids in several ways for deletes and backsides of moves. In one example, as represented in FIG. 12 and described above, the search module 104 looks at other properties of the message to find the original message in the index 120.

In an example using EXCHANGE, search module 104 can use the PR_RECORD_KEY or the PR_SOURCE_KEY. Since there may be duplicates in the index, search module 104 can probe the stored long term entry id of the indexed message to see if it is still there. For hard deletes, search module 104 can try to leverage EXCHANGE's soft delete feature. Search module 104 can try to open the short-term entry id in the notification using the SHOW_SOFT_DELETES option. Search module 104 can also use the incremental change synchronization (ICS) to get change lists from the EXCHANGE server. As a last resort, search module 104 can synchronize the folder in which the message was deleted. When this is done, search module 104 will discover the message that is missing (i.e., deleted).

In another example for deleted messages and backside of moved messages, search module 104 can use record key PR_RECORD_KEY. While PR_RECORD_KEY is unique within a given message store, PR_RECORD_KEY may appear in multiple stores (where each occurrence of PR_RECORD_KEY refers to a different message). Thus, search module 104 can use a record key of the message itself, the record key of a folder holding the message, and the last modification date of the message to assist in indexing. Using these three properties allows for uniquely identifying messages for indexing and retrieving from the index 120, or at least allows a message to be found and interrogated for properties to be indexed. These three properties are found after opening a message, and not from any notification service of an EXCHANGE source.

Another source to assist in synchronizing deleted messages and backside moves of messages is to use a soft delete function (SHOW_SOFT_DELETE) in the EXCHANGE store. Soft deletes do not permanently delete messages, but rather move them to another folder (e.g., recently deleted mail), from which they are restorable for a period of time or until a cache is full, depending on a document retention policy. Search module 104 can still search for these messages and interrogate them for properties to index them even if the message is deleted.

A still further source to assist in synchronizing deleted messages and backside moves of messages is to use a PR_SEARCH_KEY, which is a unique random number created for each message. This can be used because it copies and moves with the message, and survives with a destination message. Thus, search module 104 can use a new id and a search key to find a message, and then interrogate it for indexing. This is not as helpful in the case of deletions, but is helpful with backside of moves.

In a still further example, opening a new message (moved-to message), interrogating the message, obtaining the search key, and then looking at the index to see if another message had the search key allows search module 104 to find the moved from or backside location of the message or the backside message.

In a still further example, ICS can be used. As described above, ICS asks the EXCHANGE store what has been changed since the last request, and the added, created, and deleted messages can be determined. This can be used to determine what message was removed from message store, which message and associated information can then be deleted from the index. This is most helpful with backside or source side of moves and deletes.

D. Dropped Notification Based Synchronization

In step 910, when notifications are determined to have been dropped, a dropped notification based synchronization method is performed.

For example, EXCHANGE can sometimes drop notifications. When search module 104 gets more than a threshold rate of notifications (such threshold being implementation dependent), search module 104 assumes that some were dropped. In an embodiment, as a consequence, the search module 104 synchronizes affected folders (perhaps all folders).

Figure 13:
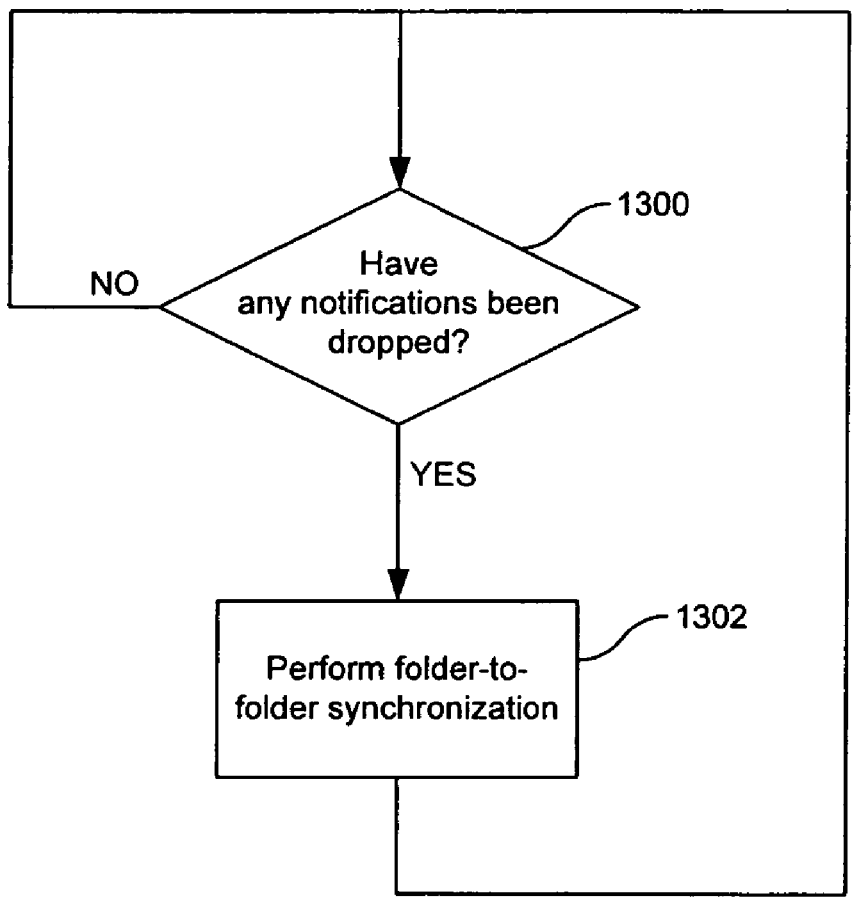
FIG. 13 shows an exemplary dropped notification synchronization method, according to one embodiment of the present invention.

FIG. 13 shows an exemplary dropped notification synchronization method that can occur during step 910, according to one embodiment of the present invention. In step 1300, a determination is made whether notifications have been dropped. This can be based on one of the techniques or criteria described below. If no, method 910 remains at step 1300. If yes, in step 1302 folder-to-folder based synchronization is performed between respective data objects associated with folders in index 120 and storage device 118, which is described in more detail below. Then, method 910 returns to step 1300.

As discussed above, in EXCHANGE, many notifications may not be generated when a large number of messages are generated.

When used with other email systems, in an embodiment, the search module 104 assumes that if a certain number of notifications happen in a certain period of time, some notifications were dropped.

For example, search module 104 can delay updates to the index 120 when the same message has multiple changes in a given period of time. In one example, a delay of about 0.1 seconds to about 2 seconds is used, and then only a last change is interrogated to index the message. This can be done using a coalescing algorithm. For example, if search module 104 detects an update, update, delete, then search module 104 indexes only the last delete. Such operation results in a reduction of overhead and wasted operations.

In another example, a large number of notifications can affect two folders of messages. This typically occurs after a large move (folder-to-folder) or a large delete of messages. In one example, if this occurs, search module 104 ignores individual changes, and instead looks only to folder notifications or changes. Then, search module 104 determines the affected folders and synchronizes data objects associated with messages in those folders. This approach is effective because search module 104 can aggregate a large number of small changes into a single large change. For example, if a large number of messages are moved from one folder to another, search module 104 synchronizes just the two folders instead of processing all of the individual notifications.

In one example, the search module 104 performs folder-to-folder synchronization by scanning data objects associated with the entire list of messages in a given folder, and also scanning the data objects associated with messages that should be in the folder from index 120. The search module 104 compiles a list of the messages that have changed, and updates the indexes 120 accordingly In anther example, during folder synchronization when a difference is found between data objects associated with data in the storage device 118 and index 120, all messages that were in the affected folder in the index 120 are deleted and then updated later when message synchronization is performed. Also, a user can chose which folders are indexed. For example, a user may not want a public folder, spam folder, or deleted messages folder indexed. The user interface of search module 104 includes a folder menu to allow the user to choose which folders to synchronize.

It is to be appreciated that folder synchronization can also be performed during steps 904, 906, 908, 912, and 914.

E. Post Application Launch Based Synchronization

In step 912, when the search module 104 is relaunched (or for some other reason has been idle for some time), a post application launch based synchronization method is performed.

Figure 14:
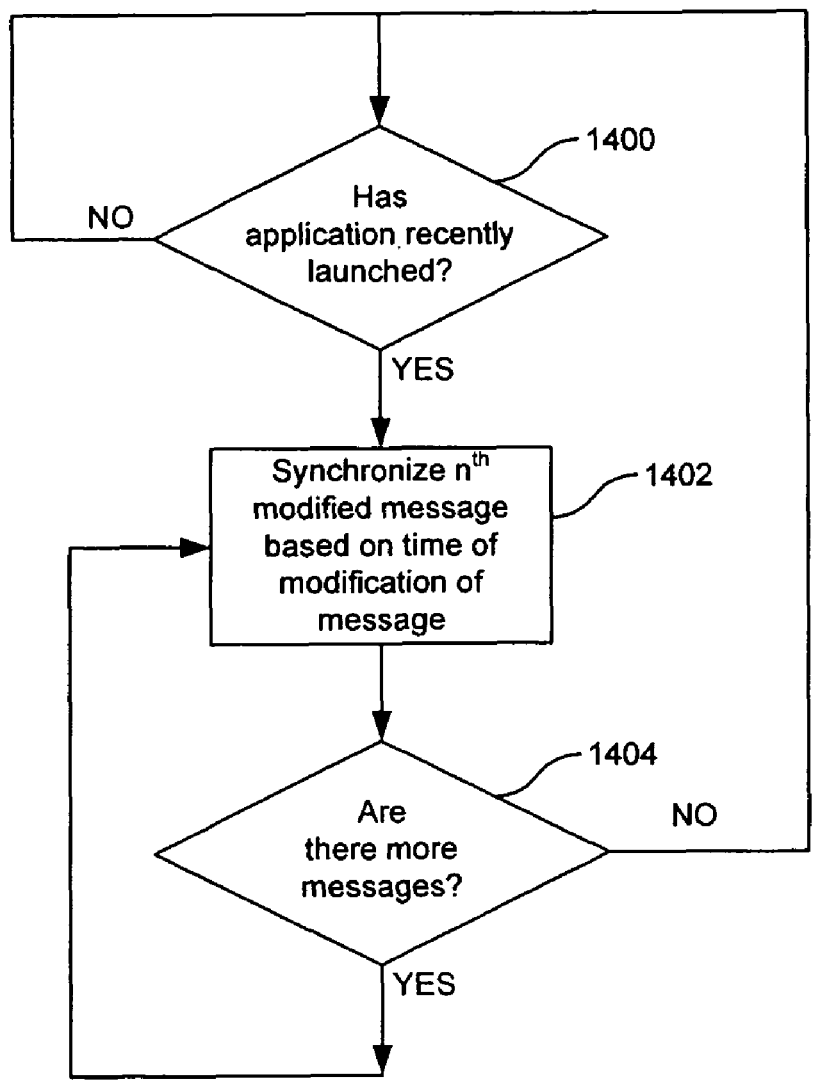
FIG. 14 shows an exemplary post application launch based synchronization method, according to one embodiment of the present invention.

FIG. 14 shows an exemplary post application launch based synchronization method that can occur during step 912, according to one embodiment of the present invention. In step 1400, a determination is made whether the search module 104 has been recently launched. If no, method 912 remains at step 1400. If yes, at step 1402 the search module 104 selects a data object associated with a message from a list where the messages are ordered from most recently modified to least recently modified, and then synchronizes the selected message. It is to be appreciated that any of the synchronization embodiments described herein can be used in step 1402.

In step 1404, a determination is made whether there are more messages from the ordered list to process. If no, method 912 returns to step 1400. If yes, then control returns to step 1402 where the next message from the ordered list is selected and synchronized.

Post application launch based synchronization shall now be described in greater detail.

The storage device 118 may changed during periods when the search module 104 is not running or is otherwise inactive. This can happen, for example, when multiple clients interact with the storage device 118. It can also happen when the user disables search module 104 and then enables it again later. In these situations, search module 104 synchronizes shortly after application launch to catch changes while search module 104 was idle.

In one example, two enumerators can be used for synchronizing after application launch: (1) a first enumerator for information regarding a folder, or a message within a folder, is compared to (2) a second enumerator for current information in the index 120. Synchronization is performed starting with a last modified date of each message (most recently modified) to an oldest modified date of a message (least recently modified). Time periods are saved to about the hundredth of a nanosecond, in some examples. Although last modified dates can be kept to about one-hundred nanoseconds, occasionally two messages can have the same last modified date. In this case, in one example, a secondary sort is used through use of the record key for each message along with a primary sort of last modified date. This is allowed because a record key is unique across each respective message store.

In one example, search module 104 compares each modified message in the folder/message to data in the index 120 using the last modified time. When a message is found in the storage device 118 that is not in the index 120, it is inserted into the index 120. When a message is found in the index 120, but not found in the storage device 118, then it is deleted from the index 120.

Thus, if there is a gap in the index 120 (referred to B messages in the following examples), then a message or folder has been added and an insertion is required in the index 120. If there is a gap in storage device 118 (referred to A messages in the following examples), then a folder or message has been deleted and deletion is required from the index 120. This should allow an updated data object of a message to be added to the index 120 as being new first, and then later the original data object of a message is deleted from the index 120 because it is determined to be unmatched.

For example, suppose A.time.1 is a first message (i.e., most recently modified) in the storage device 118, and B.time.1 is a first message in the index 120. If there is an A.time.1+n message, but only a B.time.1+n+1 (i.e., message B.time.1+n does not exist), then the A.time.1+n is new, and a matching B.time.1+n is inserted into the index 120.

In another example, suppose there is an A.time.1 and an A.time.1+n+1, and a B.time.1, B.time.1+n, and B.time.1+n+1. In this case, B.time.1+n is deleted from index 120 because A.time.1+n was missing and must have been deleted from storage device 118.

In one example, the synchronization method for individual messages or files is incremental in that not all messages need to be loaded at once time. For example, search module 104 can compare A.time.1 to B.time.1, then A.time.2 to B.time.2, etc. By operating in this manner it is unlikely any amount of messages will overwhelm the system.

Thus, search module 104 allows for interruptions in its operation since it always starts synchronization at the last modified message. Thus, it does not matter where search module 104 discontinued its operation. Further, this allows for easy synchronization after restarting of the email application. For example, operation of the search module 104 can be discontinued when the email application becomes idle, and then re-activated when the email application becomes active.

F. Online and Offline Based Synchronization

In step 914, an online and offline based synchronization method is used when the search module 104 is operating with an application that is connected via a network to storage device 118 and/or index 120.

Figure 15:
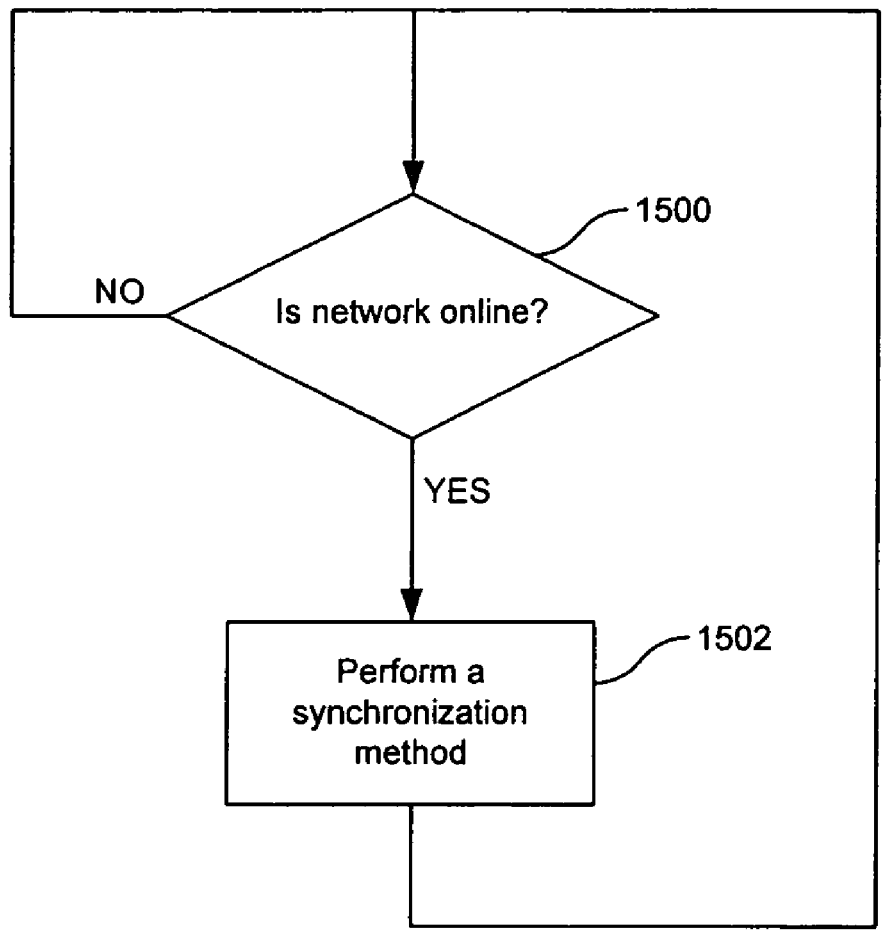
FIG. 15 shows an online/offline synchronization method, according to one embodiment of the present invention.

FIG. 15 shows an online/offline synchronization method that can occur during step 914, according to one embodiment of the present invention. In step 1500, a determination is made whether the network is online. If no, method 914 remains at step 1500. If yes, in step 1502 one or more of the synchronization embodiments described herein are performed. Then, method 914 returns to step 1500.

The online/offline synchronization embodiment shall now be described in greater detail.

When OUTLOOK is used it interacts with some mail servers (EXCHANGE) that store mail in a centralized repository. Whenever OUTLOOK starts up, it connects to these mail servers and displays the user's email in its user interface. While there are many advantages to keeping email on a centralized server, it can be inconvenient when a user is on a computer that does not have constant access to the network or when the server is not running for some reason. OUTLOOK, like many other email clients, has a feature called "Work Offline" that allows users to automatically download some or all of their email to their local machine so that they can access their email while offline When in offline mode, it may appear that some of the user's folders have been deleted or emptied of all their contents, when in reality they are simply not accessible because the user is not connected to the server. Conventional implementations of an indexing algorithm would delete the information from the index for each of these folders when the user is offline and reinsert the info whenever the user was back online. In contrast to these conventional programs, search module 104 operates by scanning the contents of the email client's repository and attempts to connect to the server in some way to verify that the folder is accessible. Then, search module 104 requests each folder for its subfolders. If search module 104 fails to connect with a folder, search module 104 records this fact and ignores any differences to any of its subfolders. In this way, search module 104 is able to distinguish between folders that have been deleted and folders that are not available because the user is in offline mode. Search module 104 can then avoid changing the index for any folders that the search program 104 cannot access when offline. Once back online, any of the synchronization methods described herein can be used to synchronize data in index 120 and storage device 118.

In one example, pseudo code for synchronizing a folder list is as follows:

```
// MAPI is the message store for Outlook
get list of stores and folders in them from MAPI
for each store
check for record key of last folder The search program were syncing, use
0 if
none
found
get all folders from MAPI with (record key >= last folder's record
key)
sorted by record key
get all folders from index with (record key >= last folder's record
key)
sorted by record key
e__mapi = enumerator for MAPI folders
e__index = enumerator for index folders
f__mapi = e__mapi->next( )
f__index = e__index->next( )
while (f__mapi && f__index) {compare f__mapi and f__index's record keys
if (they're equal) {check for different name/parent between the two,
update
index if necessary
if (folder not selected for indexing) {delete all messages in message
index for
this folder}
```

-continued

```
f_mapi = e_mapi->next( )
f_index = e_index->next( )
} else if (compare showed f_mapi not in index) (add f_mapi to folders
index
f_mapi = e_mapi->next( )
} else {
if (parent folder is reachable) {remove all messages from message index
for
this folder remove folder from folders index}
f_index = e_index->next( )
}
}
if (f_mapi) {begin fast insert
while (f_mapi) {add f_mapi to folders index
f_mapi = e_mapi->next( )
}
end fast insert
}
while (f_index) {
if (parent folder is reachable) {
remove all messages from message index for this folder
remove folder from folders index
}
f_index = e_index->next( )
}
optimize folders index
}
```

In another example, pseudo code for synchronizing messages is as follows:

```
// The algorithm below doesn't operate on all of the fields of the
// messages or the index. It only needs a subset of the data the search
program
call
// the SyncMessageData. The fields of the SyncMessageData are:
//    message identifier
//        for Outlook this is a concatenation of the store, folder,
message
//        record keys
//    message last modified date
// the compare operator compares by last mod date and then by message
identifier
for each folder f
last => retrieve last sync state
e_folder => enumerator for all sync message data from mail
folder >= last
e_index => enumerator for all sync message data from index >=
last
m_folder = e_folder->next( )
m_index = e_index->next( )
while (m_folder && m_index) {
if (m_folder == m_index) {
m_folder = e_folder->next( )
m_index = e_index->next( )
} else if (m_folder < m_index) {
persist m_folder as last sync state for f
insert m_folder into index
m_folder = e_folder->next( )
} else {
delete m_index from index
m_index = e_index->next( )
}
}
if (m_folder) { // insert the rest
while (m_folder) {
persist m_folder as last sync state for f
insert m_folder into index
m_folder = e_folder->next( )
}
} else if (m_index) { // delete the rest
while (m_index) {
delete m_index from index
m_index = e_index->next( )
}
}
```

```
// to be safe, The search program don't ever persist m_index as last
sync state
// there is no "update" case since the search program use lastmod as
a key
```

For convenience, the above description has included examples to particular software programs, such as OUTLOOK and EXCHANGE. Such reference has been made for illustrative purposes, and are not limiting. Many other email programs can also be used, each with their own set of notifications and message properties, which can be used during indexing/synchronizing, as would be apparent to one skilled in the art based on the teachings contained herein.

VI. EXEMPLARY ADDITIONAL OR ALTERNATIVE ASPECTS OF THE EMBODIMENT(S)

In one example, search module 104 can generate a welcome screen on a graphical user interface to help a user begin initial indexing after they install the program. For example, for an antispam aspect of search module 104, as described in U.S. Provisional Patent Application No. 60/616,432, filed Oct. 7, 2004, and U.S. application Ser. No. 11/245,100, filed Oct. 7, 2005, which are incorporated by reference herein in their entireties, a welcome panel assists a user in building a list of approved senders. Then, for the search aspect of search module 104, the welcome panel alerts the user that an index should be built for his saved messages when he begins using a software application associated with the saved messages, for example an email product.

The welcome panel can also help the user upgrade his index if the format of the index changes (e.g., a new version of the search module 104 is released, downloaded, and installed).

The welcome panel can also allow the user to resume an interrupted index build. This could occur, for example, if the mail application was closed during the index building process. One way to do this is using the ICS method described above. In one example, a user can decide not to use an initial index build, and instead have the index built later via options on a drop down menu associated with a tool bar in the email product. In one example, the welcome panel does not alert the user to build and index again until they upgrade to a new version of the software, in which case the user will get an update panel again. In another example, if the user is using an old version of search module 104, a welcome panel will alert him to the search module's search capabilities and the need to build an index for searching. It is to be appreciated that other operations can be performed with the welcome panel functions.

In one example, search module 104 can allow for an auto-completion mode for terms that the user is typing against terms in the index. For example, search module 104 may be scoped to fields (for example, only auto complete against terms in the subject field) or may autocomplete against original source terms, not stems or phonetically coded terms.

In one example, autocompletion can use old searches, compressed indexes, and/or other terms in the index to suggestion completions for the user's input.

In one example, search module 104 can suggest other searches using terms that are close to those entered (using a variety of methods, such as Levenshtein distance, phonetic coding, etc.). The search module 104 can also be useful to suggest corrections to misspellings and spelling variations.

In one example, a search box can be placed next to anti-spam controls on a tool bar of the email application. Within the search box, many different search schemes can be used, such as simple word searching, Boolean searching, field searching, etc., based on the underlying text searching engine incorporated into search module 104.

In one example, search results (e.g., message, contact, task, etc.) are shown in another window, which may also include another search box and/or other search queries. Then, once a result is opened, another search box can appear in the opened message, contact, etc., which can be used to search within the message itself.

In one example, the search module 104 may suggest other terms/searches similar to the search inputted, and can show the number of hits for these suggested searches. This can be achieved using the Levenshtein distance technique, for example. The search module 104 may also suggest other areas to search. Additionally, the search module 104 may display links which, if clicked, will execute the suggested searches. In another example, this can be done for email, IM, Internet, files stored in the computer, etc.

In one example, the data in the storage device 118 does not need to be in the index 120. The search module 104 can access the data as needed from the storage device 118.

In one example, search module 104 maps a single qualifier in the query language to multiple fields in the index 120. For example, the search module 104 may map the virtual field "name:" in the query language to all fields that contain names in the index 120 (from, to, cc, assistant, etc.). In some embodiments, users may define the scope of virtual fields (i.e., define the fields that map to a given virtual field).

Users download search bars onto their desktops or search engines from companies such as GOOGLE and YAHOO in order to utilize their popup blocking features, as much as to have ease of searching. According to an embodiment of the present invention, search module 104 is bundled with anti-spam and/or anti-fraud products to increase user acceptance and/or use of the search module 104. This is similar to bundling a pop-up blocker with a browser search bar, since spam is to email as pop-ups are to web pages. By default, search module 104 excludes a spam folder from search results, although this is user adjustable.

Further, this bundling increases functionality of the search module 104 by ensuring that all spam folders are identified and eliminated from a query, if a user so chooses. Also, the anti-spam filter can be used to filter out spam from the search results produced by the search module 104. Thus, by bundling the search module 104 with anti-spam applications, spam can be excluded from search results.

VII. CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections can set forth one or more, but not all exemplary embodiments of the present invention as contemplated by the inventor(s), and thus, are not intended to limit the present invention and the appended claims in any way.

What is claimed is:

1. A method, comprising:
   organizing data stored in a data storage device in one or more folders;
   organizing the one or more folders in an order based on usage history;
   indexing, using a processing device, the data storage device, the indexing being performed during a plurality of time segments and further being performed based on the order;
   scanning, using the processing device, a folder in the data storage device at a first moment in the plurality of time segments;
   scanning, using the processing device, the folder in the data storage device at a subsequent second moment in the plurality of time segments;
   monitoring for movement of sets of data stored in the data storage device from a first set storage location to a second set storage location in the data storage device;
   detecting, using the processing device, a value corresponding to a number of changes in the data stored in the data storage device between the first and second moments in time;
   determining, using the processing device, whether the value exceeds a predetermined number between the first and second moments;
   compiling a list of stored data that changed between the first and second moments;
   re-indexing the first set storage location to the second set storage location stored in the data storage device based on a respective notification associated with a last one of the changes if the value exceeds the predetermined number between the first and second moments, wherein the re-indexing is performed at a subsequent time segment using the last one of the changes indexed from a previous time segment, and the list is used to perform the re-indexing; and
   searching, using the processing device, the re-indexed data.

2. The method of claim 1, further comprising compressing the data stored in the data storage device prior to the indexing.

3. The method of claim 2, wherein the compressing step comprises at least one of stemming, phonetic coding, and Levenshtein techniques.

4. The method of claim 1, wherein the indexing comprises using historical searching criteria to categorize the data stored in the data storage device.

5. The method of claim 1, wherein the indexing is performed during time periods during which the data stored in the data storage device is not accessed.

6. The method of claim 1, wherein the data stored in the data storage device comprises a message.

7. The method of claim 6, wherein the message is at least one of email, tasks, contacts, notes, journal entries, messages, and appointments.

8. The method of claim 1, wherein the scanning at the first moment in time, the scanning at the subsequent second moment in time, the detecting, and the determining are performed during use of the data stored in the data storage device.

9. The method of claim 1, wherein the data stored in the storage device is accessed during at least one of the indexing, the scanning at the first moment in time, the scanning at the subsequent second moment in time, the detecting, the determining, the re-indexing, and searching via a network.

10. The method of claim 9, wherein the scanning at the first moment in time, the scanning at the subsequent second moment in time, the detecting, and the determining occur when the network is online.

11. The method of claim 9, further comprising determining whether the network is online and wherein the re-indexing is performed only if the network is online.

12. The method of claim 1, wherein the each of the changes comprises at least one of creating, deleting, updating, moving, and copying of the data stored in the data storage device.

13. The method of claim 1, wherein when the data stored in the data storage device moves from a source to a destination location, the re-indexing comprises re-indexing based on information correlating to the data stored in the data storage device.

14. The method of claim 1, wherein an oldest time period of one of the data stored in the data storage device is re-indexed with a most recent time period of the one of the data stored in the data storage device during the re-indexing.

15. The method of claim 1, wherein the organizing the one or more folders in an order based on usage history comprises organizing the one or more folders in an order correlating to most used to least used, and the most used folder comprises the folder with a most amount of the stored data.

16. The method of claim 1, wherein the organizing the one or more folders in an order based on usage history comprises organizing the one or more folders in an order correlating to most used to least used, and the most used folder comprises the folder having a last modified one of the data stored in the data storage device.

17. The method of claim 1, further comprising:
outputting results of the searching, wherein the searching and outputting are performed during the indexing.

18. The method of claim 1, wherein the indexing comprises:
processing the data stored in the data storage device to find fields present in the stored data; and
forming categories based on the fields.

19. The method of claim 18, wherein the fields comprise at least one of subject, body, logical fields, from, to, cc, bcc, type, size, attachments, last modified date, and first modified date of each one of the stored data.

20. The method of claim 18, wherein the fields comprise at least one of stemming, phonetic coding, and Levenshtein parameters associated with each of the stored data.

21. The method of claim 18, wherein the processing includes determining a language of the stored data.

22. The method of claim 18, wherein the processing includes filtering the stored data to remove unwanted types of the stored data.

23. The method of claim 1, further comprising:
outputting results of the searching, wherein the outputting comprises outputting results in an output format that allows for subsequent searching.

24. The method of claim 1, further comprising:
outputting results of the searching, wherein the outputting comprises outputting statistical results.

25. The method of claim 1, wherein the data storage device is coupled to at least one of an email system, an Internet system, and a computer system.

26. The method of claim 1, wherein the searching step comprises allowing for autocompletion of search terms.

27. A computer program product comprising a tangible computer useable storage memory having computer program logic stored thereon for controlling at least one processor, the computer program logic comprising:
first computer program code means for causing said at least one processor to organize data stored in a data storage device in one or more folders;
second computer program code means for causing said at least one processor to organize the one or more folders in an order based on usage history;
third computer program code means for causing said at least one processor to index the data storage device, the indexing being performed during a plurality of time segments and further being performed based on the order;
fourth computer program code means for causing said at least one processor to scan a folder in the data storage device at a first moment in the plurality of time segments;
fifth computer program code means for causing said at least one processor to scan the folder in the data storage device at a subsequent second moment in the plurality of time segments;
sixth computer program code means for causing said at least one processor to monitor for movement of sets of data stored in the data storage device from a first set storage location to a second set storage location in the data storage device;
seventh computer program code means for causing said at least one processor to detect a value corresponding to a number of changes in the data in the data storage device between the first and second moments in time;
eighth computer program code means for causing said at least one processor to determine whether the value exceeds a predetermined number between the first and second moments;
ninth computer program code means for causing said at least one processor to compile a list of stored data that changed between the first and second moments in time;
tenth computer program code means for causing said at least one processor to re-index the first set storage location to the second set storage location stored in the data storage device based on a respective notification associated with a last one of the changes if the value exceeds the predetermined number between the first and second moments, wherein the eighth computer program code means for causing said at least one processor to re-index comprises ninth computer program code means for causing said at least one processor to re-index at a subsequent time segment using the last one of the changes indexed from a previous time segment, and tenth computer program code means for causing said at least one processor to use the list to re-index; and
eleventh computer program code means for causing said at least one processor to search the re-indexed data.

28. The computer program product of claim 27, further comprising:
twelfth computer program code means for causing said at least one processor to compress the data stored in the data storage device prior to the index of the stored data.

29. The computer program product of claim 27, wherein the third computer program code means comprises:
twelfth computer program code means for causing at least one processor to use historical searching criteria to categorize the data stored in the data storage device.

30. The computer program product of claim 27, wherein the fourth, fifth, seventh, and eighth computer program code means is executed during use of the data stored in the data storage device.

31. The computer program product of claim 27, wherein the each of the changes comprises at least one of creating, deleting, updating, moving, and copying of the data stored in the data storage device.

32. The method of claim 1, further comprising:
receiving an input that is indicative which of the one or more folders to index during at least one of the indexing or the re-indexing steps.

33. The method of claim 32, wherein the receiving comprises receiving the input from a user interface, wherein the user interface comprises a folder menu configured to allow a user to select which one of the one or more folders to index.

* * * * *

UNITED STATES PATENT AND TRADEMARK OFFICE
CERTIFICATE OF CORRECTION

PATENT NO.        : 8,126,895 B2                                        Page 1 of 1
APPLICATION NO.   : 11/245100
DATED             : February 28, 2012
INVENTOR(S)       : Sargent et al.

It is certified that error appears in the above-identified patent and that said Letters Patent is hereby corrected as shown below:

Column 16, line 28, please replace "anther example" with --another example--.
Column 25, line 2, please replace "indicative which" with --indicative of which--.

Signed and Sealed this
Eighth Day of May, 2012

David J. Kappos
*Director of the United States Patent and Trademark Office*